(12) United States Patent
Lee et al.

(10) Patent No.: US 10,187,641 B2
(45) Date of Patent: *Jan. 22, 2019

(54) METHOD AND APPARATUS FOR ENCODING/DECODING MULTILAYER VIDEO SIGNAL

(71) Applicant: KT CORPORATION, Gyeonggi-do (KR)

(72) Inventors: Bae Keun Lee, Seoul (KR); Joo Young Kim, Seoul (KR)

(73) Assignee: KT CORPORATION, Gyeonggi-do (KR)

(*) Notice: Subject to any disclaimer, the term of this patent is extended or adjusted under 35 U.S.C. 154(b) by 41 days.

This patent is subject to a terminal disclaimer.

(21) Appl. No.: 15/107,128

(22) PCT Filed: Dec. 23, 2014

(86) PCT No.: PCT/KR2014/012700
§ 371 (c)(1),
(2) Date: Jun. 22, 2016

(87) PCT Pub. No.: WO2015/099400
PCT Pub. Date: Jul. 2, 2015

(65) Prior Publication Data
US 2017/0041615 A1  Feb. 9, 2017

(30) Foreign Application Priority Data

Dec. 24, 2013 (KR) .................. 10-2013-0162247
Jan. 14, 2014 (KR) .................. 10-2014-0004474

(51) Int. Cl.
*H04N 19/159* (2014.01)
*H04N 19/187* (2014.01)
(Continued)

(52) U.S. Cl.
CPC ......... *H04N 19/159* (2014.11); *H04N 19/105* (2014.11); *H04N 19/187* (2014.11);
(Continued)

(58) Field of Classification Search
CPC .. H04N 19/159; H04N 19/105; H04N 19/187; H04N 19/30
(Continued)

(56) References Cited

U.S. PATENT DOCUMENTS 9,648,333 B2 * 5/2017 He .................. H04N 19/188
2004/0017951 A1 * 1/2004 Koto ............... H04N 19/105
382/239
(Continued)

FOREIGN PATENT DOCUMENTS

CN 103024397 A 4/2013
CN 103281531 A 9/2013
(Continued)

OTHER PUBLICATIONS

Sachin Deshpande, "Comments on SHVC and MV-HEVC", JCTVC Document JCT3V-N0195v1, Jul. 16, 2013, pp. 1-7.
(Continued)

*Primary Examiner* — Zaihan Jiang
(74) *Attorney, Agent, or Firm* — IP Legal Services, LLC

(57) ABSTRACT

A method for decoding a multilayer video signal, according to the present invention, is characterized by: inducing the number of active references of a current picture in consideration of whether the maximum number of active reference pictures of the current picture in a current layer is limited; obtaining a reference layer identifier based on the number of active references; determining an active reference picture of the current picture using a reference layer identifier; generating an interlayer reference picture by upsampling the active reference picture, and performing interlayer predic-
(Continued)

tion of the current picture using an interlayer reference picture.

12 Claims, 16 Drawing Sheets

(51) Int. Cl.
*H04N 19/30* (2014.01)
*H04N 19/105* (2014.01)
*H04N 19/70* (2014.01)
*H04N 19/463* (2014.01)
*H04N 19/58* (2014.01)
*H04N 19/39* (2014.01)

(52) U.S. Cl.
CPC ............ *H04N 19/30* (2014.11); *H04N 19/39* (2014.11); *H04N 19/463* (2014.11); *H04N 19/58* (2014.11); *H04N 19/70* (2014.11)

(58) Field of Classification Search
USPC ............................................ 375/240, 240.13
See application file for complete search history.

(56) References Cited

U.S. PATENT DOCUMENTS

| | | |
|---|---|---|
| 2007/0183494 A1 | 8/2007 | Hannuksela |
| 2007/0189579 A1 | 8/2007 | Crookham et al. |
| 2008/0095234 A1 | 4/2008 | Wang et al. |
| 2009/0010331 A1 | 1/2009 | Jeon et al. |
| 2009/0010332 A1 | 1/2009 | Jeon et al. |
| 2009/0034626 A1 | 2/2009 | Park et al. |
| 2009/0060040 A1 | 3/2009 | Jeon et al. |
| 2009/0097558 A1 | 4/2009 | Ye et al. |
| 2009/0220010 A1 | 9/2009 | Park et al. |
| 2009/0310680 A1 | 12/2009 | Jeon et al. |
| 2010/0158110 A1 | 6/2010 | Pandit et al. |
| 2010/0158116 A1 | 6/2010 | Jeon et al. |
| 2010/0208809 A1 | 8/2010 | Yin et al. |
| 2010/0208810 A1 | 8/2010 | Yin et al. |
| 2011/0249745 A1 | 10/2011 | Chen et al. |
| 2012/0069903 A1 | 3/2012 | Lim et al. |
| 2012/0075436 A1 | 3/2012 | Chen et al. |
| 2012/0189058 A1 | 7/2012 | Chen et al. |
| 2012/0269275 A1* | 10/2012 | Hannuksela ....... H04N 13/0048 375/240.25 |
| 2013/0077687 A1* | 3/2013 | Wang ................... H04N 19/105 375/240.15 |
| 2013/0114723 A1 | 5/2013 | Bici et al. |
| 2013/0114742 A1* | 5/2013 | Hannuksela ..... H04N 19/00533 375/240.25 |
| 2013/0202035 A1 | 8/2013 | Chen et al. |
| 2013/0208792 A1 | 8/2013 | He et al. |
| 2013/0215975 A1* | 8/2013 | Samuelsson ........... H04N 19/70 375/240.25 |
| 2013/0243088 A1 | 9/2013 | Lim et al. |
| 2013/0279576 A1 | 10/2013 | Chen et al. |
| 2013/0315315 A1 | 11/2013 | Wahadaniah et al. |
| 2014/0010291 A1* | 1/2014 | He ......................... H04N 19/50 375/240.12 |
| 2014/0050270 A1 | 2/2014 | Lim et al. |
| 2014/0218473 A1 | 8/2014 | Hannuksela et al. |
| 2014/0247883 A1* | 9/2014 | Lee ....................... H04N 19/513 375/240.16 |
| 2014/0254681 A1* | 9/2014 | Aminlou .............. H04N 19/105 375/240.16 |
| 2014/0301452 A1 | 10/2014 | Deshpande |
| 2014/0301453 A1 | 10/2014 | Deshpande |
| 2014/0301457 A1 | 10/2014 | Pu et al. |
| 2014/0301463 A1 | 10/2014 | Rusanovskyy et al. |
| 2014/0362910 A1* | 12/2014 | Seregin ................ H04N 19/105 375/240.12 |
| 2015/0016540 A1* | 1/2015 | Rapaka ................ H04N 19/136 375/240.24 |
| 2015/0016544 A1* | 1/2015 | Wang ..................... H04N 19/52 375/240.25 |
| 2015/0023431 A1 | 1/2015 | Seregin |
| 2015/0071351 A1 | 3/2015 | Lee et al. |
| 2015/0071356 A1 | 3/2015 | Kim et al. |
| 2015/0117526 A1 | 4/2015 | Choi et al. |
| 2015/0215632 A1 | 7/2015 | Choi et al. |
| 2015/0229967 A1 | 8/2015 | Lee |
| 2015/0256844 A1 | 9/2015 | Ikai et al. |
| 2015/0288976 A1 | 10/2015 | Hendry et al. |
| 2015/0296211 A1 | 10/2015 | Chuang et al. |
| 2015/0358635 A1* | 12/2015 | Xiu ..................... H04N 19/159 375/240.16 |
| 2015/0365666 A1 | 12/2015 | Dong et al. |
| 2016/0065980 A1* | 3/2016 | Choi ..................... H04N 19/70 375/240.25 |
| 2016/0191926 A1* | 6/2016 | Deshpande .......... H04N 19/597 375/240.12 |

FOREIGN PATENT DOCUMENTS

| | | |
|---|---|---|
| CN | 103339936 A | 10/2013 |
| KR | 10-2008-0100422 A | 11/2008 |
| KR | 10-2011-0139304 A | 12/2011 |
| KR | 10-2012-0060921 A | 6/2012 |
| KR | 10-2012-0068743 A | 6/2012 |
| KR | 10-2013-0116209 A | 10/2013 |
| KR | 10-2013-0119379 A | 10/2013 |
| KR | 10-2014-0007293 A | 1/2014 |
| KR | 10-2014-0008503 A | 1/2014 |
| KR | 10-1366918 B1 | 2/2014 |
| KR | 10-2014-0029459 A | 3/2014 |
| KR | 10-2014-0034053 A | 3/2014 |
| WO | 2009/051692 A2 | 4/2009 |
| WO | 2009/052205 A1 | 4/2009 |
| WO | 2012/148139 A2 | 11/2012 |
| WO | 2013/129878 A2 | 9/2013 |

OTHER PUBLICATIONS

Miska M. Hannuksela et al., MV-HEVC/SHVC HLS: On inter-layer sample and syntax prediction indications (combining aspects of JCTVC-M0205 and JCTVC-M0046), JCTVC Document JCTVC-M0457v1, Apr. 23, 2013, pp. 1-8.

\* cited by examiner

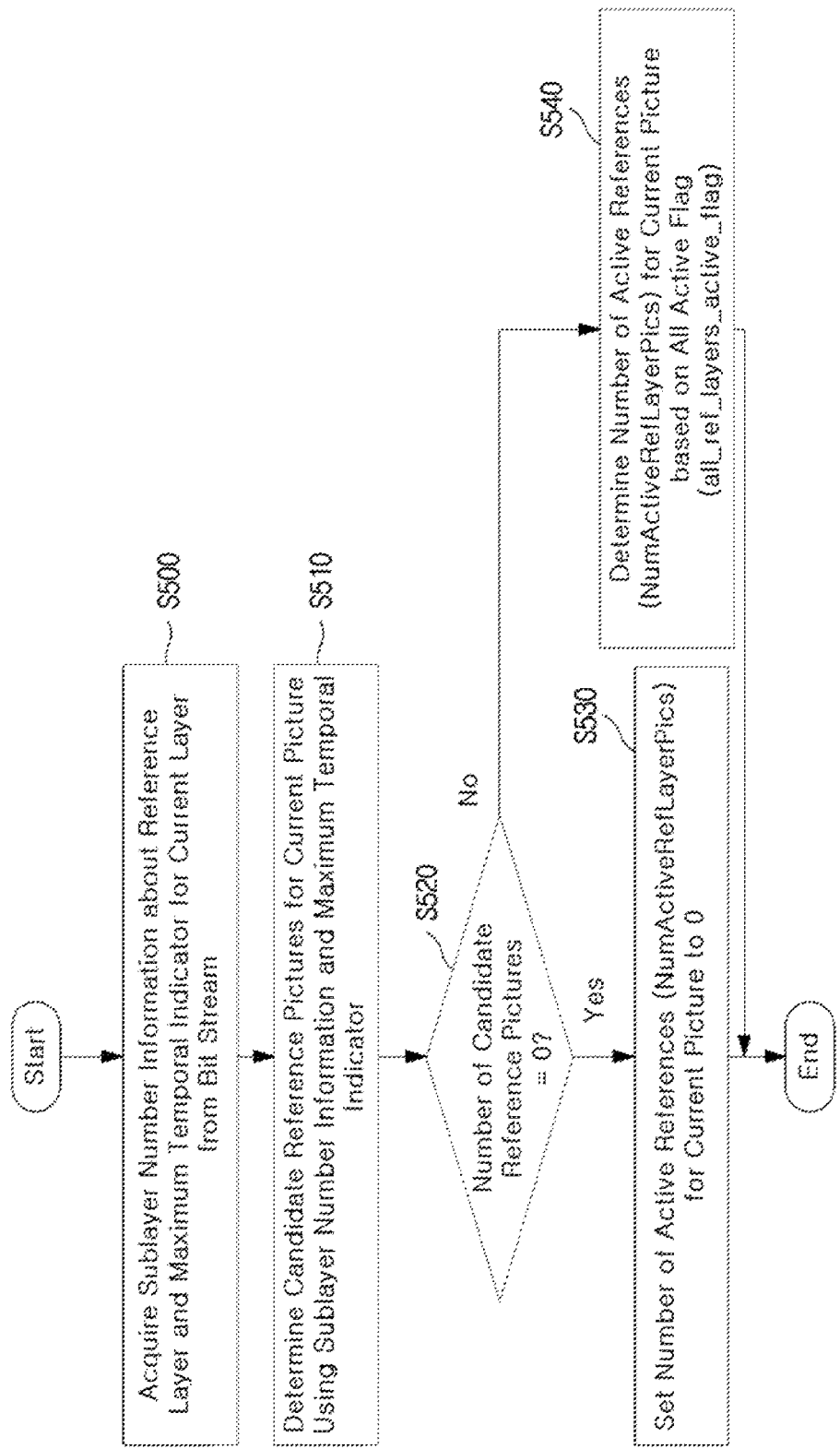

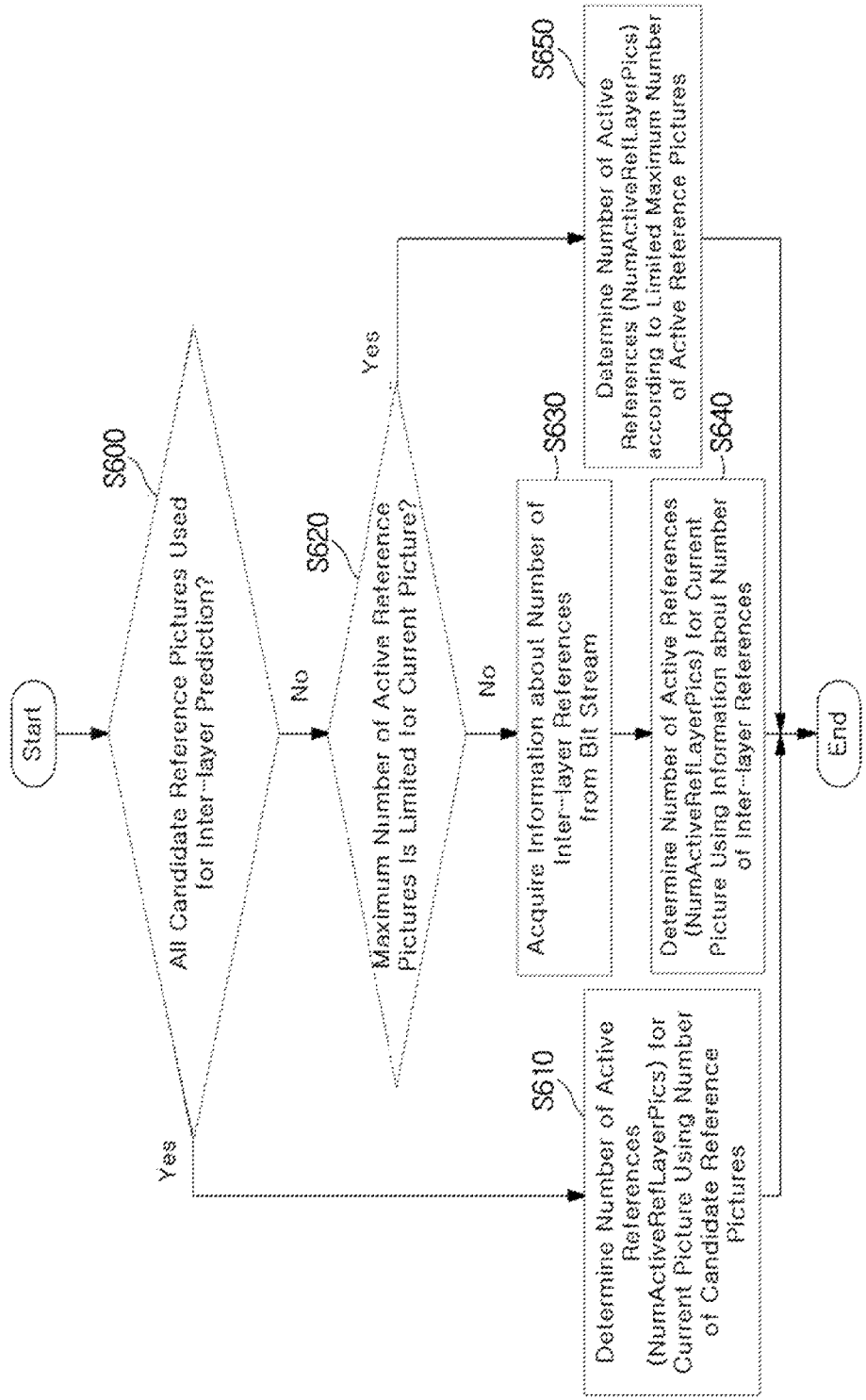

FIG. 7

| vps_extension(){ | Descriptor |
|---|---|
| ... | |
| sub_layers_vps_max_minus1_present_flag | u(1) |
| if(sub_layers_vps_max_minus1_present_flag) | |
|   for(i=0; i<=vps_max_layers_minus1; i++) | |
|     sub_layers_vps_max_minus1[i] | u(3) |
| max_tid_ref_present_flag | u(1) |
| if(max_tid_ref_present_flag ) | |
|   for(i=0; i<vps_max_layers_minus1; i++) | |
|     for(j=i+1; j<=vps_max_layers_minus1; j++) | |
|       if(direct_dependency_flag[j][i]) | |
|         max_tid_il_ref_pics_plus1[i][j] | u(3) |
| ... | |
| } | |

S700 → sub_layers_vps_max_minus1_present_flag
S710 → sub_layers_vps_max_minus1[i]

FIG. 8

| vps_extension(){ | Descriptor |
|---|---|
| ... | |
| max_tid_ref_present_flag | u(1) |
| if(max_tid_ref_present_flag) | |
|   for(i=0;i<=vps_max_layers_minus1;i++) | |
|     max_tid_il_ref_pics_plus1[i] | u(3) |
| ... | |
| } | |

S800 → max_tid_ref_present_flag
S810 → max_tid_il_ref_pics_plus1[i]

FIG. 9

| vps_extension(){ | Descriptor |
|---|---|
| ......... | |
| max_tid_ref_present_flag | u(1) |
| if(max_tid_ref_present_flag) | |
|   for(i=0;i<vps_max_layers_minus1;i++) | |
|     for(j=i+1;j<=vps_max_layers_minus1;j++) | |
|       if(direct_dependency_flag[j][i]) | |
|         max_tid_il_ref_pics_plus1[i][j] | u(3) |
| ......... | |
| } | |

S900 → max_tid_ref_present_flag
S910 → if(direct_dependency_flag[j][i])
S920 → max_tid_il_ref_pics_plus1[i][j]

FIG. 14

Reference picture list 0

| First Short-term Reference Picture | Second Short-term Reference Picture | Long-term Reference Picture | Inter-layer Reference Picture |

Reference picture list 1

| Second Short-term Reference Picture | First Short-term Reference Picture | Long-term Reference Picture | Inter-layer Reference Picture |

FIG. 15

Reference Picture List 0

| First Short-term Reference Picture | Inter-layer Reference Picture | Second Short-term Reference Picture | Long-term Reference Picture |

Reference Picture List 1

| Second Short-term Reference Picture | Inter-layer Reference Picture | First Short-term Reference Picture | Long-term Reference Picture |

FIG. 16
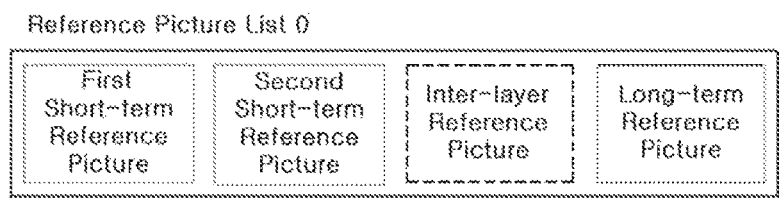
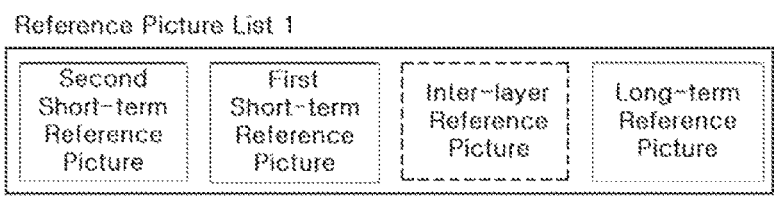
FIG. 17
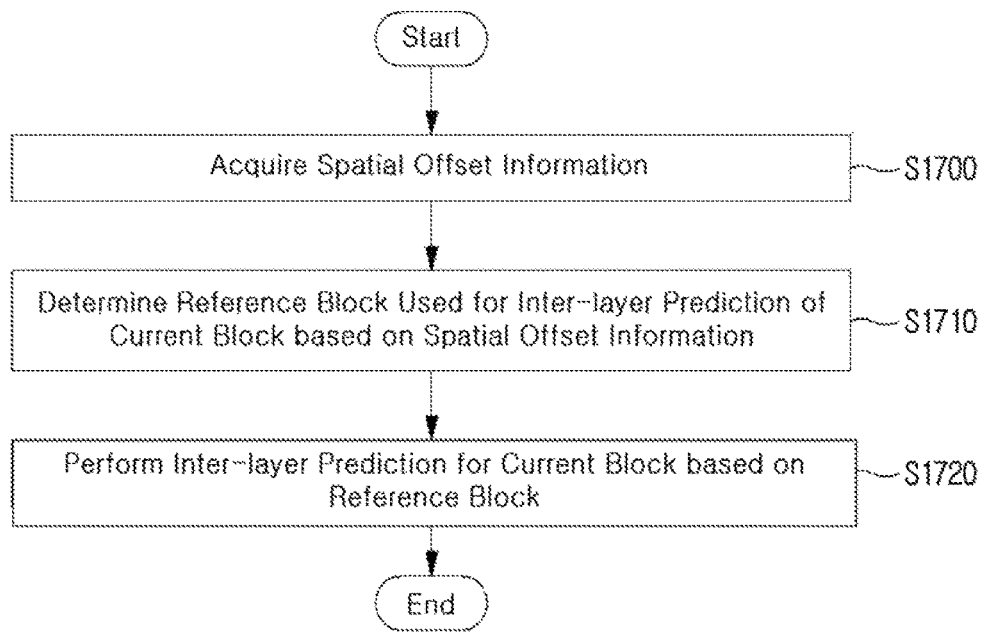

FIG. 18

| | Descriptor |
|---|---|
| vps_extension(){ | |
| ... | |
| ilp_restricted_ref_layers_flag | u(1) |
| if(ilp_restricted_ref_layers_flag) | |
| for(i=1;i<=vps_max_layers_minus1;i++) | |
| for(j=0;j<NumDirectRefLayers[layer_id_in_nuh[i]];j++){ | |
| min_spatial_segment_offset_plus1[i][j] | ue(v) |
| if(min_spatial_segment_offset_plus1[i][j]>0){ | |
| ctu_based_offset_enabled_flag[i][j] | u(1) |
| if(ctu_based_offset_enabled_flag[i][j]) | |
| min_horizontal_ctu_offset_plus1[i][j] | ue(v) |
| } | |
| } | |
| } | |
| } | |

S1800, S1810, S1820, S1830

METHOD AND APPARATUS FOR ENCODING/DECODING MULTILAYER VIDEO SIGNAL

CROSS REFERENCE TO RELATED APPLICATIONS

This application is a National Stage Patent Application of PCT International Patent Application No. PCT/KR2014/012700 (filed on Dec. 23, 2014) under 35 U.S.C. § 371, which claims priority to Korean Patent Application Nos. 10-2013-0162247 (filed on Dec. 24, 2013), and 10-2014-0004474 (filed on Jan. 14, 2014), the teachings of which are incorporated herein in their entireties by reference.

TECHNICAL FIELD

The present invention relates to a method and apparatus for encoding/decoding a multi-layer video signal.

BACKGROUND ART

Demands for high-resolution, high-quality images such as High Definition (HD) images and Ultra High Definition (UHD) images have recently increased in various fields of applications. As video data has a higher resolution and higher quality, the video data is larger in amount than traditional video data. Therefore, if video data is transmitted on an existing medium such as a wired/wireless wideband circuit or stored in an existing storage medium, transmission cost and storage cost increase. To avert these problems encountered with higher-resolution, higher-quality video data, high-efficiency video compression techniques may be used.

There are a variety of video compression techniques including inter-picture prediction in which pixel values included in a current picture are predicted from a picture previous to or following the current picture, intra-picture prediction in which pixel values included in a current picture are predicted using pixel information in the current picture, and entropy encoding in which a short code is assigned to a more frequent value and a long code is assigned to a less frequent value. Video data may be compressed effectively and transmitted or stored, using such a video compression technique.

Along with the increasing demands for high-resolution videos, demands for three-dimensional (3D) video content as a new video service have been increasing. A video compression technique for effectively providing HD and UHD 3D video content is under discussion.

DISCLOSURE

Technical Problem

An object of the present invention is to provide a method and apparatus for determining a corresponding picture of a reference layer for use in inter-layer prediction of a current picture in encoding/decoding a multi-layer video signal.

Another object of the present invention is to provide a method and apparatus for upsampling a corresponding picture of a reference layer in encoding/decoding a multi-layer video signal.

Another object of the present invention is to provide a method and apparatus for determining a reference block of a reference layer for use in inter-layer prediction of a current block in encoding/decoding a multi-layer video signal.

Another object of the present invention is to provide a method and apparatus for constructing a reference picture list with inter-layer reference pictures in encoding/decoding a multi-layer video signal.

Another object of the present invention is to provide a method and apparatus for effectively deriving texture information about a current layer through inter-layer prediction in encoding/decoding a multi-layer video signal.

Technical Solution

According to the present invention, a method and apparatus for decoding a multi-layer video signal includes determining the number of active references for a current picture of a current layer in consideration of whether a maximum number of active reference pictures for the current picture is limited, acquiring a reference layer Identifier (ID) based on the determined number of active references, determining an active reference picture for the current picture using the reference layer ID, generating an inter-layer reference picture by upsampling the active reference picture, and performing inter-layer prediction for the current picture, using the inter-layer reference picture.

In the method and apparatus for decoding a multi-layer video signal according to the present invention, it may be determined whether the maximum number of active reference pictures for the current picture is limited, based on a maximum active reference flag.

In the method and apparatus for decoding a multi-layer video signal according to the present invention, the maximum active reference flag may indicate whether the maximum number of active reference pictures for each picture of a video sequence is 1.

In the method and apparatus for decoding a multi-layer video signal according to the present invention, if the maximum number of active reference pictures is limited to 1 according to the maximum active reference flag, the number of active references may be determined according to the limited maximum number of active reference pictures.

In the method and apparatus for decoding a multi-layer video signal according to the present invention, the inter-layer prediction may be performed for the current picture by determining a reference block for use in inter-layer prediction of a current block in the current picture based on spatial offset information, and estimating a sample value of the current block based on the determined reference block.

In the method and apparatus for decoding a multi-layer video signal according to the present invention, the spatial offset information may include at least one of a segment offset and a block offset.

According to the present invention, a method and apparatus for encoding a multi-layer video signal according to the present invention includes determining the number of active references for a current picture of a current layer in consideration of whether a maximum number of active reference pictures for the current picture is limited, acquiring a reference layer ID based on the determined number of active references, determining an active reference picture for the current picture using the reference layer ID, generating an inter-layer reference picture by upsampling the active reference picture, and performing inter-layer prediction for the current picture, using the inter-layer reference picture.

In the method and apparatus for encoding a multi-layer video signal according to the present invention, it may be determined whether the maximum number of active reference pictures for the current picture is limited, based on a maximum active reference flag.

In the method and apparatus for encoding a multi-layer video signal according to the present invention, the maximum active reference flag may indicate whether the maximum number of active reference pictures for each picture of a video sequence is 1.

In the method and apparatus for encoding a multi-layer video signal according to the present invention, if the maximum number of active reference pictures is limited to 1 according to the maximum active reference flag, the number of active references may be determined according to the limited maximum number of active reference pictures.

In the method and apparatus for encoding a multi-layer video signal according to the present invention, the inter-layer prediction may be performed for the current picture by determining a reference block for use in inter-layer prediction of a current block in the current picture based on spatial offset information, and estimating a sample value of the current block based on the determined reference block.

In the method and apparatus for encoding a multi-layer video signal according to the present invention, the spatial offset information may include at least one of a segment offset and a block offset.

Advantageous Effects

According to the present invention, a corresponding picture of a reference layer for use in inter-layer prediction of a current picture in a current layer can be effectively determined.

According to the present invention, a picture of a reference layer can be effectively upsampled.

According to the present invention, a reference block of a reference layer for use in inter-layer prediction of a current block can be effectively determined.

According to the present invention, a reference picture list including inter-layer reference pictures can be effectively constructed.

According to the present invention, texture information about a current layer can be effectively derived through inter-layer prediction.

BRIEF DESCRIPTION OF THE DRAWINGS

FIG. 5 is a flowchart illustrating a method for determining the number of active references of a current picture, NumActiveRefLayerPics using information about the number of sub-layers and a maximum temporal indicator in an embodiment to which the present invention is applied.

FIG. 6 is a flowchart illustrating a method for determining the number of active references of a current picture, NumActiveRefLayerPics based on an all active flag all_ref_layers_active_flag in an embodiment to which the present invention is applied.

FIG. 7 illustrates a syntax table of information about the number of sub-layers in an embodiment to which the present invention is applied.

FIG. 8 illustrates a method for acquiring a maximum temporal indicator based on a maximum temporal level present flag in an embodiment to which the present invention is applied.

FIG. 9 illustrates a method for acquiring a maximum temporal indicator in consideration of direct dependency in an embodiment to which the present invention is applied.

FIGS. 14, 15, and 16 illustrate a method for constructing a reference picture list in a multilayer structure in an embodiment to which the present invention is applied.

FIG. 17 is a flowchart illustrating an operation for performing inter-layer prediction for a current block based on spatial offset information in an embodiment to which the present invention is applied.

FIG. 18 illustrates a syntax table of spatial offset information in an embodiment to which the present invention is applied.

BEST MODE FOR CARRYING OUT THE INVENTION

Figure 1:
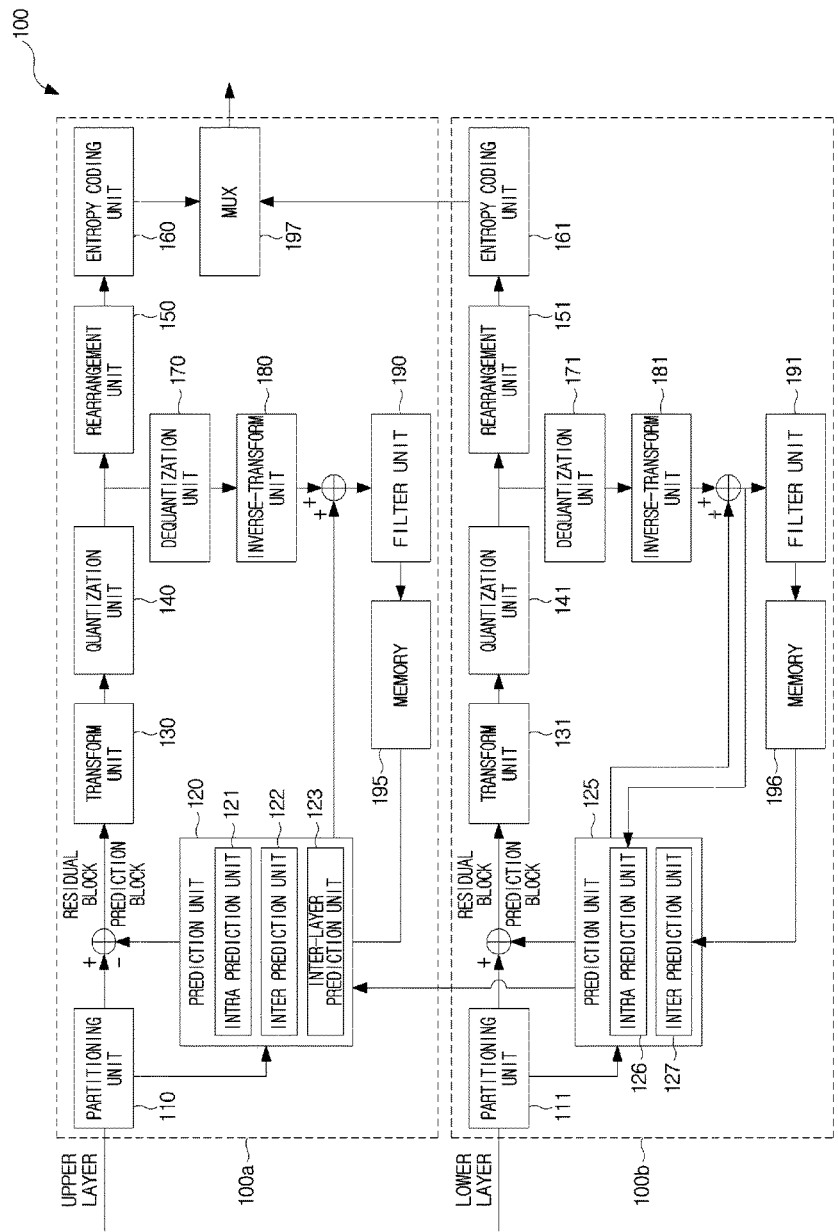
FIG. 1 is a block diagram illustrating an encoding apparatus according to an embodiment of the present invention.

A method and apparatus for decoding a multi-layer video signal according to the present invention are characterized in that the number of active references for a current picture of a current layer is determined in consideration of whether the maximum number of active reference pictures for the current picture is limited, a reference layer Identifier (ID) is acquired based on the determined number of active references, an active reference picture for the current picture is determined using the reference layer ID, an inter-layer reference picture is generated by upsampling the active reference picture, and inter-layer prediction is performed for the current picture, using the inter-layer reference picture.

The method and apparatus for decoding a multi-layer video signal according to the present invention are characterized in that it is determined whether the maximum number of active reference pictures for the current picture is limited, based on a maximum active reference flag.

The method and apparatus for decoding a multi-layer video signal according to the present invention are characterized in that the maximum active reference flag indicates whether the maximum number of active reference pictures for each picture of a video sequence is 1.

The method and apparatus for decoding a multi-layer video signal according to the present invention are characterized in that if the maximum number of active reference pictures is limited to 1 according to the maximum active reference flag, the number of active references is determined according to the limited maximum number of active reference pictures.

The method and apparatus for decoding a multi-layer video signal according to the present invention are characterized in that the inter-layer prediction is performed for the current picture by determining a reference block for use in inter-layer prediction of a current block in the current picture based on spatial offset information, and estimating a sample value of the current block based on the determined reference block.

The method and apparatus for decoding a multi-layer video signal according to the present invention are characterized in that the spatial offset information includes at least one of a segment offset and a block offset.

A method and apparatus for encoding a multi-layer video signal according to the present invention are characterized in that the number of active references for a current picture of a current layer is determined in consideration of whether the maximum number of active reference pictures for the current picture is limited, a reference layer ID is acquired based on the determined number of active references, an active reference picture for the current picture is determined using the reference layer ID, an inter-layer reference picture is generated by upsampling the active reference picture, and inter-layer prediction is performed for the current picture, using the inter-layer reference picture.

The method and apparatus for encoding a multi-layer video signal according to the present invention are characterized in that it is determined whether the maximum number of active reference pictures for the current picture is limited, based on a maximum active reference flag.

The method and apparatus for encoding a multi-layer video signal according to the present invention are characterized in that the maximum active reference flag indicates whether the maximum number of active reference pictures for each picture of a video sequence is 1.

The method and apparatus for encoding a multi-layer video signal according to the present invention are characterized in that if the maximum number of active reference pictures is limited to 1 according to the maximum active reference flag, the number of active references is determined according to the limited maximum number of active reference pictures.

The method and apparatus for encoding a multi-layer video signal according to the present invention are characterized in that the inter-layer prediction is performed for the current picture by determining a reference block for use in inter-layer prediction of a current block in the current picture based on spatial offset information, and estimating a sample value of the current block based on the determined reference block.

The method and apparatus for encoding a multi-layer video signal according to the present invention are characterized in that the spatial offset information includes at least one of a segment offset and a block offset.

Mode for Carrying Out the Invention

Preferred embodiments of the present invention will be described below in detail with reference to the attached drawings. Before the detailed description, it is to be understood that terms or words as used in the present disclosure and the claims should be interpreted not as their general or dictionary meanings but as meanings and concepts matching the scope and spirit of the present invention based on the principle that the inventor can define the concepts of terms appropriately in the best manner. Therefore, the embodiments as described below and configurations shown in the drawings are merely preferred embodiments of the present invention, not representing all of the technical subject matter of the present invention. Accordingly, it is to be understood that they can be replaced with various equivalents and modification examples at the time of filing the present invention.

When it is said that a component is "coupled with/to" or "connected to" another component, it should be understood that the one component is coupled or connected to the other component directly or through any other component in between. In the present disclosure, the term "include" does not exclude the presence of any other component than a specific component, meaning that an additional component may be included in an embodiment of the present invention or the scope of the present invention.

The term as used in the present disclosure, first or second may be used to describe various components, not limiting the components. These expressions are used to distinguish one component from another component. For example, a first component may be referred to as a second component and vice versa without departing the scope of the present disclosure.

Also, components in embodiments of the present invention are shown as independent to illustrate different characteristic functions, not meaning that each component is configured in a separate hardware unit or one software unit. That is, each component is enumerated separately, for the convenience of description. Thus, two or more components may be incorporated into one component or one component may be divided into a plurality of components. An embodiment of integrating components and an embodiment of dividing a component fall into the scope of the present invention.

Some components may be optional to increase performance, not essential to main functions of the present invention. The present invention may be implemented only with components essential to the subject matter of the present invention, without components used just to increase performance, which falls within the scope of the present invention.

Video encoding and decoding that supports multiple layers of a bit stream is called scalable video coding. Because there is a strong correlation between the multiple layers, redundant components of data may be eliminated and video coding performance may be increased, by performing prediction based on the correlation. Prediction of a current layer using information about another layer is referred to as inter-layer prediction.

The multiple layers may have different resolutions. Herein, a resolution may mean at least one of a spatial resolution, a temporal resolution, and image quality. To control resolution during inter-layer prediction, a layer may be subjected to resampling such as upsampling or downsampling.

FIG. 1 is a block diagram schematically illustrating an encoding device according to an embodiment of the present invention.

An encoding device 100 according to the present invention includes an encoding unit 100a for an upper layer and an encoding unit 100b for a lower layer.

The upper layer may be called a current layer or an enhancement layer, and the lower layer may be called an enhancement layer having resolution lower than that of the upper layer, a base layer or a reference layer. At least one of the spatial resolution, temporal resolution based on a frame rate, color format, and image quality based on a quantization step size may differ between the upper layer and the lower layer. When a change of resolution is required for inter-layer prediction, up-sampling or down-sampling of the layer may be performed.

The encoding unit 100a for the upper layer may include a partitioning unit 110, a prediction unit 120, a transform unit 130, a quantization unit 140, a rearrangement unit 150, an entropy coding unit 160, an inverse quantization unit 170, an inverse-transform unit 180, a filter unit 190, and memory 195.

The encoding unit 100b for the lower layer may include a partitioning unit 111, a prediction unit 125, a transform unit 131, a quantization unit 141, a rearrangement unit 151, an entropy coding unit 161, an inverse quantization unit 171, an inverse-transform unit 181, a filter unit 191, and memory 196.

The encoding unit may be implemented by a video encoding method described in an embodiment of the present invention, which will be described below, but the operations of some parts may not be performed in order to reduce the complexity of the encoding device or to enable fast real-time encoding. For example, rather than a method in which all intra-prediction mode methods are used to select the optimal intra-encoding method, a method in which one is selected from among a limited number of intra-prediction modes and the selected one is set as the final intra-prediction mode may be performed for real-time encoding when the prediction unit performs intra-prediction. In another example, a prediction block used for intra-prediction or inter-prediction may have a limited shape.

The unit of a block processed in the encoding device may be a coding unit for performing coding, a prediction unit for performing prediction, or a transform unit for performing transformation. The coding unit, the prediction unit, and the transform unit may be represented as CU, PU, and TU, respectively.

Each of the partitioning units 110 and 111 may partition a layer by partitioning a layer picture into multiple combinations of coding blocks, prediction blocks, and transform blocks, and by selecting one combination of coding blocks, prediction blocks, and transform blocks based on a predetermined reference (for example, a cost function). For example, in order to partition a layer picture into coding units, a recursive tree structure such as a QuadTree structure may be used. Hereinafter, in an embodiment of the present invention, a coding block may mean not only a block for encoding but also a block for decoding.

A prediction block may be a unit for performing prediction, such as intra-prediction or inter-prediction. A block for intra-prediction may be a block having the form of a square, such as 2N×2N or N×N. As a block for inter-prediction, there are a block in the form of a square, such as 2N×2N and N×N, a block in the form of a rectangle, such as 2N×N and N×2N, and a block having an asymmetric form, obtained by a prediction block partitioning method using Asymmetric Motion Partitioning (AMP). The transform unit 115 may use different transform methods depending on the form of the prediction block.

Each of the prediction units 120 and 125 of the encoding units 100a and 100b may include an intra-prediction unit 121 or 126 for performing intra-prediction and an inter-prediction unit 122 or 127 for performing inter-prediction. The prediction unit 120 of the encoding unit 100a for the upper layer may further include an inter-layer prediction unit 123, which performs prediction of the upper layer using the information relating to the lower layer.

Each of the prediction units 120 and 125 may determine whether to perform inter-prediction or intra-prediction of a prediction block. When intra-prediction is performed, an intra-prediction mode is determined based on a prediction block, and a process for processing intra-prediction based on the determined intra-prediction mode may be performed based on a transform block. A residual (residual block) between the generated prediction block and the original block may be input to the transform units 130 and 131. Also, the prediction mode information used for prediction, motion information, and the like are encoded along with the residual by the entropy coding unit 130, and may be transmitted to the decoding device.

When a Pulse Code Modulation (PCM) mode is used, the original block may be encoded unchanged without performing prediction using the prediction units 120 and 125, and may be transmitted to a decoding unit.

Each of the intra-prediction units 121 and 126 may generate an intra-predicted block based on reference pixels located around the current block (the prediction target block). In the intra-prediction method, the intra-prediction mode may have a directional prediction mode, which uses reference pixels according to the prediction direction, and a non-directional mode, which does not consider a prediction direction. The mode for predicting luma information may be different from the mode for predicting chroma information. Intra-prediction mode, obtained by predicting luma information, or the predicted luma information may be used to predict chroma information. Meanwhile, if the reference pixels are not available, a prediction block may be generated by replacing the unavailable reference pixels with other pixels.

A prediction block may include multiple transform blocks. If the size of a prediction block is the same as the size of a transform block when performing intra-prediction, intra-prediction of the prediction block may be performed based on a left pixel, an upper-left pixel, and an upper pixel of the prediction block. However, as the time of intra-prediction, when the sizes of the prediction block and the transform block are different and multiple transform blocks are included inside the prediction block, neighboring pixels adjacent to the transform blocks are used as reference pixels to perform the intra-prediction. Here, the neighboring pixels adjacent to the transform block may include at least one of neighboring pixels adjacent to the prediction block and previously decoded pixels in the prediction blocks.

The intra-prediction method may generate a prediction block after applying a Mode-Dependent Intra Smoothing (MDIS) filter to reference pixels according to the intra-prediction mode. The type of MDIS filter applied to the reference pixels may vary. The MDIS filter is an additional filter applied to an intra-predicted block generated by performing intra-prediction, and may be used for reducing a residual between reference pixels and the intra-predicted block, generated after performing prediction. When MDIS filtering is performed, different filtering may be performed on reference pixels and on some columns included in the intra-predicted block according to the direction of the intra-prediction mode.

Each of the inter-prediction units 122 and 127 may perform prediction by referring to the information about a block included in at least one of the picture preceding and the picture following the current picture. Each of the inter-prediction units 122 and 127 may include a reference picture interpolation unit, a motion prediction unit, and a motion compensation unit.

The reference picture interpolation unit may receive reference picture information from memory 195 or 196 and may generate information about a pixel, which is smaller than an integer pixel, from the reference picture. For a luma pixel, a DCT-based 8-tap interpolation filter, which differently sets filter coefficients to generate information about a pixel that is smaller than an integer pixel in units of ¼ pixels, may be used. For chroma signals, a DCT-based 4-tap interpolation filter, which differently sets filter coefficients to generate information about a pixel that is smaller than an integer pixel in units of ⅛ pixels, may be used.

Each of the inter-prediction units 122 and 127 may perform motion prediction based on the reference picture interpolated by the reference picture interpolation unit. As a method for calculating a motion vector, various methods, such as a Full search-based Block Matching Algorithm (FBMA), a Three-Step Search (TSS) algorithm, and a New Three-Step Search (NTS) Algorithm, may be used. The motion vector may have a motion vector value corresponding to ½ or ¼ of the interpolated pixel. Each of the inter-prediction units 122 and 127 may perform prediction on a current block using any one of various inter-prediction methods.

As the inter-prediction method, any of various methods such as a skip method, a merge method, and a Motion Vector Prediction (MVP) method may be used.

In inter-prediction, motion information, that is, information about a reference index, a motion vector, and a residual signal, is entropy-coded and then transferred to the decoding unit. When a skip mode is applied, a residual signal is not generated, and thus a procedure for transforming and quantizing a residual signal may be omitted.

The inter-layer prediction unit 123 performs inter-layer prediction for predicting an upper layer using information about the lower layer. The inter-layer prediction unit 123 may perform inter-layer prediction using the texture information, motion information, etc. of the lower layer.

The inter-layer prediction may be performed by setting the picture of the lower layer as a reference picture and performing prediction on the current block of the upper layer using motion information in the picture of the lower layer (reference layer). The picture of the reference layer, used as a reference picture in the inter-layer prediction, may be a picture that is sampled so as to match the resolution of the current layer. Also, the motion information may include a motion vector and a reference index. In this case, the motion vector value for the picture of the reference layer may be set to (0.0).

As an example of the inter-layer prediction, a prediction method that uses the picture of a lower layer as a reference picture is described, but the present invention is not limited to this. The inter-layer prediction unit 123 may additionally perform inter-layer texture prediction, inter-layer motion prediction, inter-layer syntax prediction, inter-layer residual prediction, and the like.

The inter-layer texture prediction may derive the texture of the current layer based on the texture of the reference layer. The texture of the reference layer may be sampled to match the resolution of the current layer, and the inter-layer prediction unit 123 may predict the texture of the current layer based on the sampled texture of the reference layer.

The inter-layer motion prediction may derive the motion vector of the current layer based on the motion vector of the reference layer. In this case, the motion vector of the reference layer may be scaled to match the resolution of the current layer. The inter-layer syntax prediction may predict the syntax of the current layer based on the syntax of the reference layer. For example, the inter-layer prediction unit 123 may use the syntax of the reference layer as the syntax of the current layer. Also, the inter-layer residual prediction may reconstruct the picture of the current layer using the residual between the restored picture of the reference layer and the restored picture of the current layer.

A residual block including residual information, which is the difference between the prediction block generated by each of the prediction units 120 and 125 and the reconstructed block of the prediction block, is generated, and the residual block is input to the corresponding transform unit 130 or 131.

Each of the transform units 130 and 131 may transform the residual block using a transform method such as a Discrete Cosine Transform (DCT) or Discrete Sine Transform (DST). Whether to apply DCT or DST to transform the residual block may be determined based on the intra-prediction mode information of the prediction block used to generate the residual block and the size information of the prediction block. That is, each of the transform units 130 and 131 may use different transform methods depending on the size of the prediction block and the prediction method.

Each of the quantization units 140 and 141 may quantize values transformed in the frequency domain by the corresponding transform unit 130 or 131. The quantization coefficients may change depending on the type of block or the importance of the pictures. The value calculated by the quantization unit 140 or 141 may be provided to the inverse-quantization unit 170 or 17 and the rearrangement unit 150 or 151.

Each of the rearrangement units 150 and 151 may rearrange coefficient values of the quantized residual value. The rearrangement unit 150 or 151 may change a 2D block format coefficient to a 1D vector format coefficient using a coefficient scanning method. For example, the rearrangement unit 150 or 151 may change the 2D block format coefficient to a 1D vector format coefficient by scanning coefficients ranging from a DC coefficient to a high-frequency band coefficient using a zigzag scanning method. Depending on the size of the transform block and on the intra-prediction mode, a vertical scanning method for scanning 2D block format coefficients in a column direction and a horizontal scanning method for scanning 2D block format coefficients in a row direction, rather than the zigzag scanning method, may be used. That is, the determination of which one of the zigzag scanning, vertical scanning, and horizontal scanning methods is to be used may be made depending on the size of the transform block and the intra-prediction mode.

Each of the entropy coding units 160 and 161 may perform entropy coding based on the values calculated by the rearrangement unit 150 or 151. The entropy coding may be implemented using, for example, various coding methods such as Exponential Golomb, Context-Adaptive Variable Length Coding (CAVLC), and Context-Adaptive Binary Arithmetic Coding (CABAC).

The entropy coding units 160 and 161 may perform entropy coding based on a predetermined coding method by receiving various information, such as residual coefficient information and block type information of a coding block, prediction mode information, partition unit information, prediction block information and transmission unit information, motion vector information, reference frame information, interpolation information for a block, filtering information, and the like, from the rearrangement units 150 and 151 and the prediction units 120 and 125. Also, the entropy coding units 160 and 161 may entropy-code the coefficient value of a coding unit, input from the rearrangement units 150 and 151.

Each of the entropy coding units 160 and 161 may encode the intra-prediction mode information of the current block by binary-coding the intra-prediction mode information. The entropy coding units 160 and 161 may include a codeword mapping unit for the binary coding, and may perform the binary coding differently depending on the size of the prediction block for intra-prediction. The codeword mapping unit may adaptively generate a codeword mapping table through a binary coding operation, or may have a previously generated mapping table. In another embodiment, the entropy coding units 160 and 161 may represent the intra-prediction mode information about the current block using a code-num mapping unit for performing code-num mapping and a codeword mapping unit for performing codeword mapping. The code-num mapping unit and the codeword mapping unit may generate a code-num mapping table and a codeword mapping table, respectively, or may respectively have a previously generated code-num mapping table and codeword mapping table.

Each of the inverse quantization units 170 and 171 and the inverse transform unit 180 or 181 may inverse-quantize the values quantized by the quantization unit 140 or 141 and inverse-transform the values transformed by the transform unit 130 or 131. The residual value generated by the inverse quantization unit 170 or 171 and the inverse transform unit 180 or 181 may be combined with the prediction block predicted by the motion estimation unit, the motion compensation unit, and the intra-prediction unit, which are included in the prediction unit 120 or 125, and thus a reconstructed block may be generated.

Each of the filter units 190 and 191 may include at least one of a deblocking filter and an offset correction unit.

The deblocking filter may remove block distortion, generated due to the boundaries between blocks, in the reconstructed picture. Whether to perform deblocking, namely, whether to apply the deblocking filter to the current block, may be determined based on the pixels included in some rows or columns of the block. When the deblocking filter is applied to a block, a strong filter or a weak filter may be applied according to the required strength of deblocking filtering. Also, in applying the deblocking filter, when vertical filtering and horizontal filtering are performed, the vertical filtering and the horizontal filtering may be processed in parallel.

The offset correction unit may correct an offset between the picture on which deblocking is performed and the original picture in pixel units. In order to perform the offset correction on a specific picture, a method in which the pixels included in the picture are divided into certain areas, the area to which an offset is to be applied is determined, and the offset is applied to the area may be used, or a method in which the offset is applied in consideration of the information about the edge of each pixel may be used.

Each of the filter units 190 and 191 may be implemented using only a deblocking filter, or using both a deblocking filter and offset correction, rather than using all of a deblocking filter and offset correction.

Each of the memory 195 and 196 may store the reconstructed block or pictures calculated by the filter unit 190 or 191, and the reconstructed block and pictures stored in the memory may be provided to the prediction unit 120 or 125 when intra-prediction is performed.

Information output from the entropy coding unit 100*b* of the lower layer and information output from the entropy coding unit 100*a* of the upper layer are multiplexed by the MUX 197, and may then be output in the form of a bitstream.

The MUX 197 may be included in the encoding unit 100*a* of the upper layer or the encoding unit 100*b* of the lower layer, or may be implemented as a separate device or module, unlike the encoding unit 100.

Figure 2:
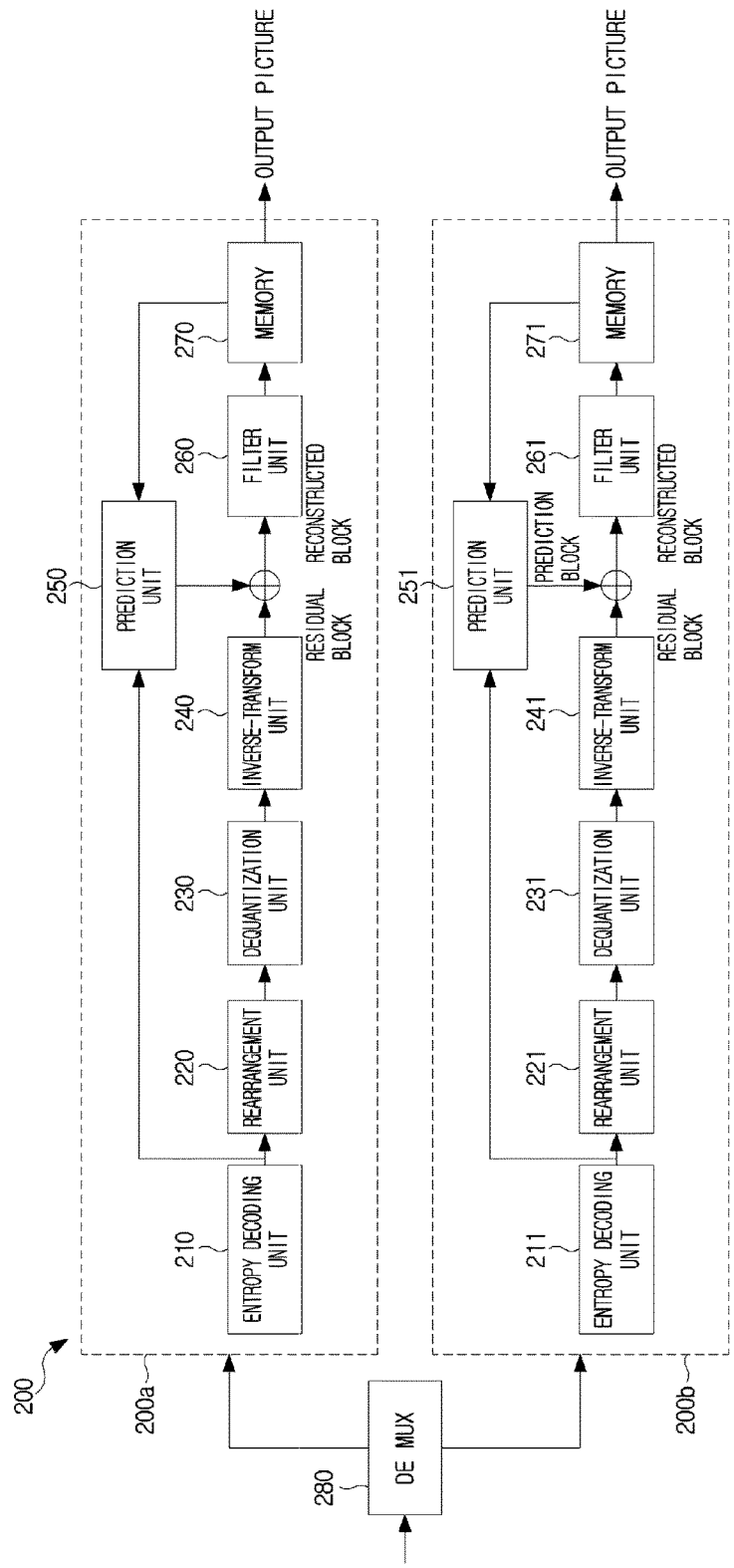
FIG. 2 is a block diagram illustrating a decoding apparatus according to an embodiment of the present invention.

FIG. 2 is a block diagram schematically showing a decoding device according to an embodiment of the present invention.

As shown in FIG. 2, a decoding device 200 includes a decoding unit 200*a* of an upper layer and a decoding unit 200*b* of a lower layer.

The decoding unit 200*a* of the upper layer may include an entropy decoding unit 210, a rearrangement unit 220, an inverse-quantization unit 230, an inverse-transform unit 245, a prediction unit 250, a filter unit 260, and memory 270.

The decoding unit 200*b* of the lower layer may include an entropy decoding unit 211, a rearrangement unit 221, an inverse-quantization unit 231, an inverse-transform unit 241, a prediction unit 251, a filter unit 261, and memory 271.

When a bitstream including multiple layers is transmitted from the encoding device, a demultiplexer (DEMUX) 280 demultiplexes the information corresponding to each of the layers and transmits the result to the decoding unit 200*a* or 200*b* of each of the layers. The input bitstream may be decoded through a process that is the reverse of the process of the encoding device.

Each of the entropy decoding units 210 and 211 may perform entropy-decoding through the reverse of the entropy-coding process performed by the entropy coding unit of the encoding device. Among the pieces of information decoded by the entropy decoding units 210 and 211, information required to generate a prediction block is provided to the prediction units 250 and 251, and a residual, entropy-decoded by the entropy decoding unit, may be input to the rearrangement units 220 and 221.

Each of the entropy decoding units 210 and 211 may use at least one of CABAC and CAVLC, like the entropy coding units 160 and 161.

Each of the entropy decoding units 210 and 211 may decode information about intra-prediction and inter-prediction performed by the encoding device. Each of the entropy decoding units 210 and 211 includes a codeword mapping unit that has a codeword mapping table for generating an intra-prediction mode number from a received codeword. The codeword mapping table may be stored in advance, or may be generated adaptively. When a codeNum mapping table is used, a codeNum mapping unit for performing codeNum mapping may be additionally arranged.

Each of the rearrangement units 220 and 221 may rearrange the bitstream, entropy-decoded by the entropy decoding unit 210 or 211, based on the arrangement method used by the encoding unit. The coefficients, represented in one-dimensional vector form, may be rearranged as 2-dimensional block-type coefficients by being reconstructed. Each of the rearrangement units 220 and 221 receives the information about the coefficient scanning method performed by the encoding unit, and may rearrange the coefficients using a method in which inverse scanning is performed based on the sequence of scanning performed by the encoding unit.

Each of the inverse-quantization units 230 and 231 may perform inverse quantization based on the quantization parameter provided by the encoding device and the rearranged coefficients of the block.

Each of the inverse-transform units 240 and 241 may perform inverse DCT or inverse DST, which correspond to DCT and DST performed by the corresponding transform unit 130 or 131, on the result of quantization performed by the encoding device. The inverse-transform may be performed in transmission units determined by the encoding device. In the transform unit of the encoding device, DCT and DST may be selectively performed according to multiple pieces of information, such as the prediction method, the size of the current block, the prediction direction, and the like. The inverse-transform unit 240 or 241 of the decoding device may perform inverse transform based on the information about the transform performed by the transform unit of the encoding device. Transform may be performed based on a coding block rather than a transform block.

Each of the prediction units 250 and 251 may generate a prediction block based on information about the generation of the prediction block, provided by the entropy decoding units 210 and 211, and information about previously decoded blocks or pictures, provided from the corresponding memory 270 or 271.

Each of the prediction units 250 and 251 may include a prediction unit determination unit, an inter-prediction unit, and an intra-prediction unit.

The prediction unit determination unit receives various information, including prediction unit information input from the entropy decoding unit, prediction mode information about an intra-prediction method, motion prediction information about an inter-prediction method, and the like, separates a prediction block from a current coding block, and determines whether the prediction block performs intra-prediction or inter-prediction.

The inter-prediction unit may perform inter-prediction of the current prediction block based on information included in at least one of the picture preceding and the picture following the current picture, which includes the current prediction block, using information required for inter-prediction of the current prediction block provided by the encoding device. In order to perform inter-prediction, it may be determined whether the method used as the motion prediction method of the prediction block included in the coding block based on the corresponding coding block is a skip mode, a merge mode, or a mode (AMVP mode) using a Motion vector Predictor (MVP).

The intra-prediction unit may generate a prediction block based on information about reconstructed pixels in the current picture. When the prediction block is a prediction block on which intra-prediction is performed, intra-prediction may be performed based on the intra-prediction mode information about the prediction block, provided by the encoding device. The intra-prediction unit may include an MDIS filter for performing filtering on reference pixels of the current block, a reference pixel interpolation unit for generating reference pixels in units smaller than a single pixel by interpolating the reference pixels, and a DC filter for generating a prediction block through filtering when the prediction mode of the current block is a DC mode.

The prediction unit 250 of the decoding unit 200a of the upper layer may further include an inter-layer prediction unit for performing inter-layer prediction, in which the upper layer is predicted using information relating to the lower layer.

The inter-layer prediction unit may perform inter-layer prediction by using intra-prediction mode information, motion information, etc.

The inter-layer prediction is implemented such that prediction of a current block of the upper layer is performed by adopting a lower layer picture as a reference picture and using motion information about the picture of the lower layer (reference layer).

In the inter-layer prediction, a picture of the reference layer, which is used as a reference picture, may be sampled suitably for the resolution of a current layer. In addition, the motion information may include the motion vector and reference index. At this point, a motion vector value for the reference layer picture may be set as (0, 0).

As an example of the inter-layer prediction, a prediction method for using the lower layer picture as a reference picture is described, but is not limited thereto. The inter-layer prediction unit 123 may additionally perform an inter-layer texture prediction, an inter-layer motion prediction, an inter-layer syntax prediction, and an inter-layer residual prediction, etc.

The inter-layer texture prediction may derive texture of a current layer based on texture of the reference layer. The reference layer texture may be sampled suitably for the resolution of the current layer, and the inter-layer prediction unit may predict the current layer texture based on the sampled texture. The inter-layer motion prediction may derive a motion vector of the current layer based on the motion vector of the reference layer. Here, the motion vector of the reference layer may be scaled suitably for the resolution of the current layer. In the inter-layer syntax prediction, current layer syntax may be predicted based on the reference layer syntax. For example, the inter-layer prediction unit 123 may use the reference layer syntax as current layer syntax. In addition, in the inter-layer residual prediction, the picture of the current layer may be reconstructed by using a difference between a reconstructed image of the reference layer and a reconstructed image of the current layer.

The reconstructed block or picture may be provided to each of the filter units 260 and 261. Each of the filter units 260 and 261 may include a deblocking filter and an offset correcting unit.

Information on whether a deblocking filter is applied to a corresponding block or picture and information on whether a strong filter or a weak filter is applied, when the deblocking filter is applied, may be received from the encoding device. The deblocking filter of the decoding device may receive deblocking filter-related information provided from the encoding device and the decoding device may perform deblocking filtering on a corresponding block.

The offset correction unit may perform offset correction on a reconstructed image based on the type of the offset correction and offset value information applied to an image at the time of coding.

Each of the memories 270 and 271 may store the reconstructed picture or block to allow them to be used as the reference picture or the reference block and may also output the reconstructed picture.

The encoding device and decoding device may perform encoding on three layers or more, not on two layers, and in this case, the coding unit and the decoding unit for the upper layer may be provided in plural numbers in correspondence to the number of upper layers.

In scalable video coding (SVC) for supporting a multi-layer structure, there is association between layers. When prediction is performed by using this association, data duplication elements may be removed and image coding performance may be improved.

Accordingly, when a picture (i.e. an image) of a current layer (i.e. an enhancement layer) to be encoded/decoded is predicted, inter-layer prediction by using information of another layer may be performed as well as inter prediction or intra-prediction using information of the current layer.

When the inter layer prediction is performed, prediction samples for the current layer may be generated by using a decoded picture of a reference layer, which is used for inter-layer prediction, as a reference picture.

In this case, since at least one of the spatial resolution, temporal resolution, and image quality may differ between the current layer and the reference layer (due to the difference in scalability between the layers), the decoded picture of the reference layer is resampled to be adapted to the scalability of the current layer, and may then be used as the reference picture for the inter-layer prediction of the current layer. "Resampling" means up-sampling or down-sampling the samples of the reference layer picture to match the picture size of the current layer picture.

In this specification, the current layer is the layer on which encoding or decoding is performed, and may be an enhancement layer or an upper layer. The reference layer is the layer that is referred to for inter-layer prediction of the current layer, and may be a base layer or a lower layer. The picture of the reference layer (that is, the reference picture) used for inter-layer prediction of the current layer may be called an inter-layer reference picture or a reference picture between layers.

Figure 3:
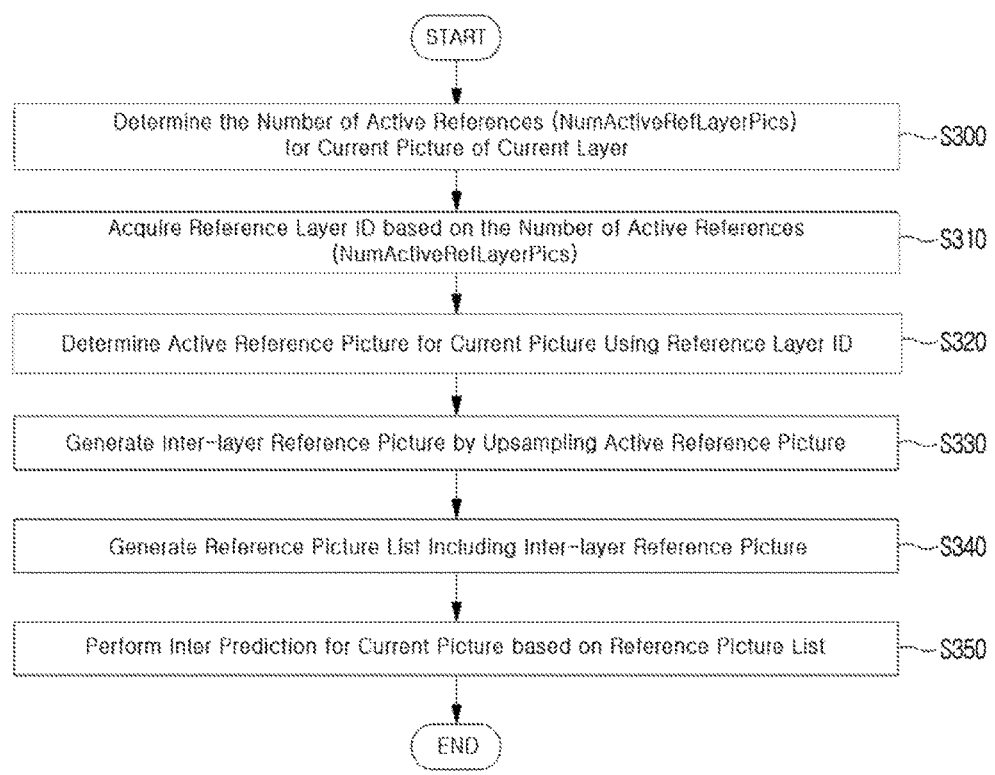
FIG. 3 is a flowchart illustrating an operation for performing inter-layer prediction for a current layer using a corresponding picture of a reference layer in an embodiment to which the present invention is applied.

FIG. 3 is a flowchart illustrating an operation for performing inter-layer prediction for a current layer using a corresponding picture of a reference layer in an embodiment to which the present invention is applied.

Referring to FIG. 3, the number of active references, NumActiveRefLayerPics for a current picture of a current layer may be determined (S300).

Corresponding pictures of one or more reference layers may be used for inter-layer prediction of the current picture of the current layer. The number of corresponding pictures used for inter-layer prediction of the current picture of the current layer among the corresponding pictures of the reference layers is referred to as the number of active references, NumActiveRefLayerPics. Hereinbelow, a corresponding picture used for inter-layer prediction of the current picture is referred to as an active reference picture.

The current layer may refer to a layer having direct dependency on a reference layer. The reference layer may mean a layer including at least one active reference picture for the current layer. Accordingly, the number of reference layers used for inter-layer prediction of the current layer, NumDirectRefLayers may be equal to or larger than the number of active references, NumActiveRefLayerPics.

A corresponding picture may refer to a picture located at the same time instant as the current picture of the current layer. For example, the corresponding picture may be a picture having the same Picture Order Count (POD) information as the current picture of the current layer. The corresponding picture may belong to the same Access Unit (AU) as the current picture of the current layer. The corresponding picture may have the same temporal ID TemporalID as the current picture of the current layer. The temporal ID, TemporalID may refer to an ID identifying each of a plurality of layers encoded scalably according to a temporal resolution.

The number of active references, NumActiveRefLayerPics may be determined in consideration of whether the maximum number of active reference pictures is limited. Or the number of active references, NumActiveRefLayerPics may be determined based on information about the number of sublayers and a maximum temporal indicator. This will be described in detail with reference to FIGS. 4 to 9.

A reference layer ID may be acquired based on the number of active references, NumActiveRefLayerPics determined in step S300 (S310).

The reference layer ID may mean the layer ID nuh_layer_id of a layer including an active reference picture for the current picture.

Specifically, as many reference layer IDs as the number of active references, NumActiveRefLayerPics may be acquired. Only when the number of active references, NumActiveRefLayerPics is different from the number of direct layers for the current layer, NumDirectRefLayers, the reference layer IDs may be acquired. If the number of active references, NumActiveRefLayerPics is equal to the number of direct layers for the current layer, NumDirectRefLayers, this implies that all reference layers in a direct dependency relationship with the current layer have active reference pictures for the current picture. Therefore, there is no need for signaling reference layer IDs separately in order to identify layers including active reference pictures for the current picture.

An active reference picture for the current picture may be determined using the reference layer ID acquired in step S310 (S320).

Specifically, a picture corresponding to the current picture in a reference layer identified by the reference layer ID may be determined to be an active reference picture for the current picture. As described before, the corresponding picture may refer to a picture at the same time instant as the current picture or a picture having the same POC information as the current picture. Or the corresponding picture may refer to a picture belonging to the same AU as the current picture.

An inter-layer reference picture may be generated by upsampling the active reference picture determined in step S320 (S330).

Specifically, the inter-layer reference picture may include at least one of a first inter-layer reference picture and a second inter-layer reference picture. The first inter-layer reference picture may refer to a reference picture obtained by filtering an integer position, and the second inter-layer reference picture may refer to a reference picture subjected to no filtering of an integer position.

An integer position may mean pixels of an integer unit in an upsampled active reference picture. Or if interpolation is performed in a unit equal to or below an integer number of pixels, that is, in an 1/n pixel unit during the upsampling, n phases are produced and the integer position may refer to a position with phase 0 (i.e., a pixel position of an integer being an n multiple after interpolation). Filtering of an integer position may be performed using adjacent integer positions. The adjacent integer positions may be in the same row or column as the current filtered integer position. The adjacent integer positions may refer to a plurality of integer positions in the above same row or column. Herein, the plurality of integer positions may be sequential in the same row or column. A specific upsampling method will be described with reference to FIG. 10.

However, if the current layer and the reference layer have the same resolution, the above upsampling procedure may be omitted. In this case, the determined active reference picture may still be used as an inter-layer reference picture.

A reference picture list may be generated with a temporal reference picture and the inter-layer reference picture generated in step S330 (S340).

Specifically, the reference picture list for the current picture may include reference pictures (hereinbelow, referred to as temporal reference pictures) belonging to the same layer as the current picture. The temporal reference pictures may refer to pictures having a different output order (e.g., a different POC) from that of the current picture. A method for generating a reference picture list with temporal reference pictures will be described with reference to FIGS. 11, 12, and 13.

Meanwhile, the reference picture list may further include an inter-layer reference picture, for inter-layer prediction of the current picture. That is, a picture of a different layer as well as a picture of the same layer may be referred to in a multi-layer structure (e.g., scalable video coding or multi-view video coding). A method for constructing a reference picture list with inter-layer reference pictures will be described with reference to FIGS. 14, 15, and 16.

As described before with reference to step S330, an inter-layer reference picture may include at least one of a first inter-layer reference picture and a second inter-layer reference picture. Therefore, a reference picture list may be configured so as to include one of the first and second inter-layer reference pictures, or a reference picture list may be configured so as to include both of the first and second inter-layer reference pictures.

For selective use of the first inter-layer reference picture and the second inter-layer reference picture, it may be determined whether to use both or one of the first and second inter-layer reference pictures. Further, if one of the first and second inter-layer reference pictures is selectively used, which one to be used between the first and second inter-layer reference pictures may be determined. For this purpose, an encoding device may signal information indicating an inter-layer reference picture to be used between the first and second inter-layer reference pictures.

Or for selective use of the first and second inter-layer reference pictures, a reference index may be used. Specifically, only one or both of the first and second inter-layer reference pictures may be selected on a prediction block basis by means of a reference index.

If an inter-layer reference picture is added to the reference picture list, there is a need for changing the number of reference pictures listed in the reference picture list or a range for the number of reference indexes allocated per reference picture.

It is assumed herein that the syntax num_ref_idx_l0_active_minus1 and num_ref_idx_l1_active_minus1 of a slice header indicating a maximum reference index value in a reference picture list for a base layer for which inter-layer prediction is not performed ranges from 0 to 14.

If one of the first and second inter-layer reference pictures is used, a syntax num_ref_idx_l0_active_minus1 and num_ref_idx_l1_active_minus1 representing a maximum reference index value in a reference picture list for a current layer may be defined to range from 0 and 15.

Even though both of the first and second inter-layer reference pictures are used, if the two inter-layer reference pictures are added to different reference picture lists, num_ref_idx_l0_active_minus1 and num_ref_idx_l1_active_minus1 may be defined to range from 0 and 15.

For example, if the number of temporal reference pictures in reference picture list L0 is 15, addition of the first or second inter-layer reference picture to reference picture list L0 results in the existence of 16 reference pictures in total and thus the value of num_ref_idx_l0_active_minus1 becomes 15.

Or in the case where both of the first and second inter-layer reference pictures are used, if the two inter-layer reference pictures are added to the same reference picture list, it may be defined that the syntax representing the maximum reference index value of a reference picture list for a current layer, num_ref_idx_l0_active_minus1 and num_ref_idx_l1_active_minus1 ranges from 0 to 16.

For example, if the number of temporal reference pictures in reference picture list L0 is 15, addition of the first and second inter-layer reference picture to reference picture list L0 results in the existence of 17 reference pictures in total and thus the value of num_ref_idx_l0_active_minus1 becomes 16.

Inter prediction may be performed for the current picture based on the reference picture list generated in step S340 (S350).

Specifically, a reference picture corresponding to a reference index of the current block is selected. The selected reference picture may be a temporal reference picture in the same layer as the current block, or an inter-layer reference picture (i.e., an upsampled active reference picture or an active reference picture).

A reference block in the reference picture may be determined based on a motion vector of the current block, and the sample value or texture information of the current block may be predicted using a recovered sample value or texture information of the determined reference block.

If the reference picture corresponding to the reference index of the current block is an inter-layer reference picture, the reference block may be a block (hereinafter, referred to as a call block) located at the same position as the current block. For this purpose, if the reference picture of the current block is an inter-layer reference picture, the motion vector of the current block may be set to (0, 0).

Or if the reference picture corresponding to the reference index of the current block is an inter-layer reference picture, a block spaced from the call block by a predetermined offset may be used as a reference block, which will be described in detail with reference to FIGS. 17, 18, and 19.

Figure 4:
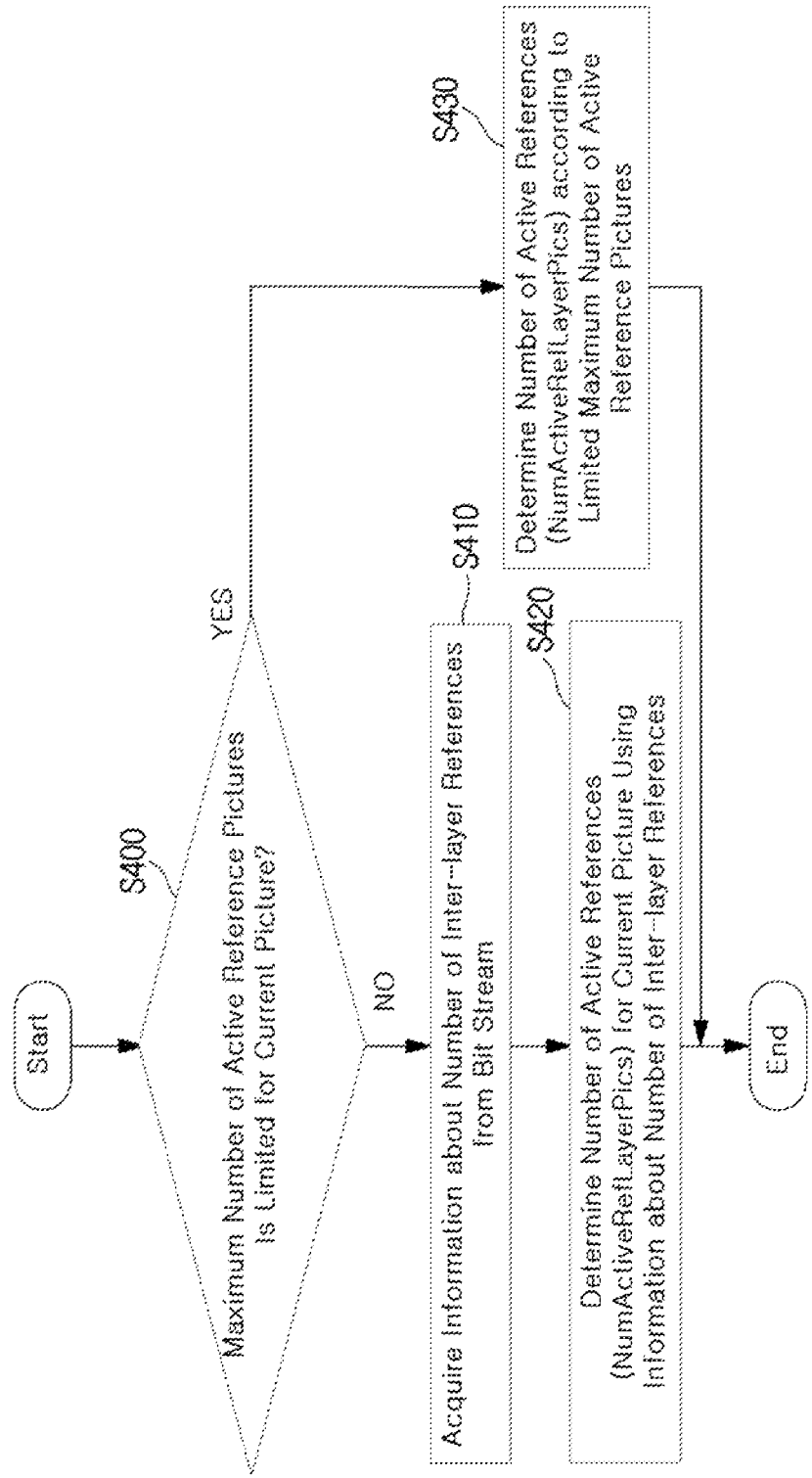
FIG. 4 is a flowchart illustrating a method for determining the number of active references, NumActiveRefLayerPics in consideration of whether the maximum number of active reference pictures is limited in an embodiment to which the present invention is applied.

FIG. 4 illustrates a method for determining the number of active references, NumActiveRefLayerPics in consideration of whether the maximum number of active reference pictures is limited in an embodiment to which the present invention is applied.

Referring to FIG. 4, it may be determined whether the maximum number of active reference pictures for a current picture is limited (S400).

Specifically, it may be determined whether the maximum number of active reference pictures for the current picture is limited, based on a maximum active reference flag, max_one_active_ref_layer_flag.

The maximum active reference flag may indicate whether the maximum number of active reference pictures for each picture of a video sequence is 1. For example, if the value of the maximum active reference flag is 1, the number of active reference pictures available for inter-layer prediction of each picture of the video sequence may be limited to 1. On the other hand, if the value of the maximum active reference flag is 0, a plurality of active reference pictures are available for inter-layer prediction of each picture of the video sequence. The maximum active reference flag may be acquired from a video parameter set commonly applied to a bit stream, particularly pictures included in a received video sequence.

If it is determined that the maximum number of active reference pictures for the current picture is not limited in step S400, information about the number of inter-layer references, num_inter_layer_ref_pics_minus1 may be acquired from the bit stream (S410).

The information about the number of inter-layer references is encoded information used to determine the number of active reference pictures. For example, the information about the number of inter-layer references may be encoded to a value being (the number of active reference pictures for use in inter-layer prediction of the current picture−1), for encoding efficiency.

The number of active references for the current picture, NumActiveRefLayerPics may be determined using the information about the number of inter-layer references, acquired in step S410 (S420).

For example, if the information about the number of inter-layer references is encoded to a value being (the number of active reference pictures for use in inter-layer prediction of the current picture−1), the number of active references for the current picture, NumActiveRefLayerPics may be calculated by adding 1 to the information about the number of inter-layer references.

On the contrary, if it is determined that the maximum number of active reference pictures for the current picture is limited in step S400, the number of active references for the current picture, NumActiveRefLayerPics may be determined according to the limited maximum number of active reference pictures for the current picture (S430).

For example, if the maximum number of active reference pictures for the current picture is limited to 1 according to the maximum active reference flag, max_one_active_ref_layer_flag, the number of active references for the current picture, NumActiveRefLayerPics may be set to 1.

FIG. 5 illustrates a method for determining the number of active references NumActiveRefLayerPics using sublayer number information and a maximum temporal indicator in an embodiment to which the present invention is applied.

Referring to FIG. 5, information about the number of sublayers of a reference layer and a maximum temporal indicator for a current layer may be acquired from a bit stream (S500).

One layer may include a plurality of scalably encoded sublayers having different temporal resolutions. In order to increase coding efficiency, information about the maximum number of temporal sublayers included in one layer may be encoded to a value being (the maximum number of temporal sublayers−1). This information is called sublayer number information. Accordingly, the sublayer number information may be defined as information used to determine the maximum number of temporal sublayers included in a reference layer. A method for acquiring sublayer number information will be described in detail with reference to FIG. 7.

Meanwhile, if the temporal resolution of the current picture encoded in the current layer is low (i.e., the temporal ID, TemporalID of the current picture has a small value), the display order differences between the current picture and already-decoded pictures of the current layer are large. In this case, there is a high possibility of different video properties between the current picture and the already-decoded pictures. Therefore, instead of the already-decoded pictures of the current layer, a corresponding picture of a reference layer is highly likely to be used as a reference picture.

On the contrary, if the temporal resolution of the current picture encoded in the current layer is high (i.e., the temporal ID TemporalID of the current picture has a large value), the display order differences between the current picture and the already-decoded pictures of the current layer are not large. In this case, there is a high possibility of similar video properties between the current picture and the already-decoded pictures. Therefore, instead of a corresponding picture of a reference layer, the already-decoded pictures of the current layer are highly likely to be used as reference pictures.

Since inter-layer prediction is effective when the temporal resolution of the current picture is low as described above, it is necessary to determine whether inter-layer prediction is to be allowed, in consideration of a specific temporal ID TemporalID of a reference layer. For this purpose, the maximum value of the temporal IDs of reference layers allowed for inter-layer prediction of the current layer may be signaled. The maximum value of the temporal IDs is referred to as a maximum temporal indicator. A method for acquiring a maximum temporal indicator will be described with reference to FIGS. 8 and 9.

Candidate reference pictures for the current picture may be determined using the sublayer number information about the reference layer and the maximum temporal indicator for the current layer (S510).

Specifically, a candidate reference picture for the current picture may be determined in consideration of whether a corresponding picture of the reference layer satisfies the following first and second conditions. Herein, the candidate reference picture refers to a candidate available for inter-layer prediction of the current picture, and is distinguished from an active reference picture used for inter-layer prediction of the current picture.

[First condition] sublayer number information>=temporal ID of corresponding picture, TemporalId

[Second condition] maximum temporal indicator> temporal ID of corresponding picture If the corresponding picture of the reference layer satisfies the first and second conditions (i.e., the temporal ID of the corresponding picture is smaller than or equal to the sublayer number information, and smaller than the maximum temporal indicator), the corresponding picture may be determined to be a candidate reference picture available for inter-layer prediction of the current picture.

This is because if the maximum temporal indicator is defined to be a value being (the maximum of the temporal IDs of reference layers allowed for inter-layer prediction of the current layer+1), it is allowed to perform inter-layer prediction only using a picture having a temporal ID smaller than the maximum temporal indicator from among the pictures of the reference layer.

On the other hand, if the corresponding picture of the reference layer does not satisfy at least one of the first and second conditions (i.e., the temporal ID of the corresponding picture is larger than the sublayer number information, or equal to or larger than the maximum temporal indicator), the corresponding picture may be determined to be a picture restricted for use in inter-layer prediction of the current picture.

This is because the temporal ID of a corresponding picture cannot be larger than a value being (the maximum number of temporal sublayers included in a reference layer−1). Also, it is because that if the maximum temporal ID of the reference layer is defined as a value being (the maximum of the temporal IDs of reference layers allowed for inter-layer prediction of the current layer+1), a corresponding picture having a temporal ID larger than the maximum of the temporal IDs of pictures in the reference layer is restricted for use in inter-layer prediction of the current layer.

As described above, corresponding pictures satisfying the first and second conditions may be selected from among all reference layers placed in a direct dependency relationship with the current layer, and determined to be candidate reference pictures for the current picture.

Further, the corresponding pictures satisfying the first and second conditions (i.e., the candidate reference pictures) may be counted and the count may be set as the number of candidate references, numRefLayerPics. It may occur that none of the corresponding pictures satisfy the first and second conditions. In this case, the number of candidate references, numRefLayerPics may be set to 0.

Referring to FIG. 5, it may be determined whether the number of candidate reference pictures (i.e., the number of candidate references numRefLayerPics) determined in step S510 is 0 (S520).

If the number of candidate references, numRefLayerPics is 0 in step S520, the number of active references NumActiveRefLayerPics for the current picture may be set to 0 (S530).

On the contrary, if the number of candidate references, numRefLayerPics is not 0, all or a part of the candidate reference pictures for the current picture may be used as active reference pictures for the current picture. The number of active references NumActiveRefLayerPics for the current picture may be determined based on an all active flag all_ref_layers_active_flag, for selective use of candidate reference pictures as described above (S540). This will be described below with reference to FIG. 6.

FIG. 6 illustrates a method for determining the number of active references NumActiveRefLayerPics for the current picture based on the all active flag all_ref_layers_active_flag in an embodiment to which the present invention is applied.

Referring to FIG. 6, it may be determined whether to apply the constraint that all candidate reference pictures of a current picture are used for inter-layer prediction of the current picture in a current layer (S600).

Specifically, it may be determined whether to apply the constraint that all candidate reference pictures are used for inter-layer prediction of the current picture, based on the all active flag all_ref_layers_active_flag.

The all active flag all_ref_layers_active_flag may indicate whether a candidate reference picture indicated by the sublayer number information and the maximum temporal indicator from among corresponding pictures of reference layers placed in the direct dependency relationship with the current layer is used for inter-layer prediction of the current picture.

For example, if the all active flag all_ref_layers_active_flag is 1, all of the candidate reference pictures for the current picture are used for inter-layer prediction of the current picture. On the contrary, if the all active flag all_ref_layers_active_flag is 0, the constraint that all of the candidate reference pictures of the current picture are used for inter-layer prediction of the current picture is not applied. That is, all or only a part of candidate reference pictures indicated by the sublayer number information and the maximum temporal indicator are used for inter-layer prediction of the current picture.

If the constraint that all of the candidate reference pictures of the current picture are used for inter-layer prediction of the current picture is applied in step S600, the number of active references NumActiveRefLayerPics for the current picture may be determined based on the determined number of candidate reference pictures (S610).

Specifically, the number of active references NumActiveRefLayerPics for the current picture may be set to be equal to the number of candidate references NumRefLayerPics determined by counting the number of candidate reference pictures of the current picture.

If the constraint that all of the candidate reference pictures of the current picture are used for inter-layer prediction of the current picture is not applied in step S600, it may be determined whether the maximum number of active reference pictures for the current picture is limited (S620).

Specifically, it may be determined whether the maximum number of active reference pictures for the current picture is limited, based on the maximum active reference flag, max_one_active_ref_layer_flag.

The maximum active reference flag may indicate whether the maximum number of active reference pictures for each picture of a video sequence is 1. For example, if maximum active reference flag is 1, the maximum number of active reference pictures for each picture of a video sequence may be restricted to 1. On the contrary, if maximum active reference flag is 0, inter-layer prediction may be performed for each picture of the video sequence, using a plurality of active reference pictures. The maximum active reference flag may be acquired from a video parameter set commonly applied to a bit stream, particularly pictures included in a received video sequence.

If it is determined that the maximum number of active reference pictures for the current picture is not limited in step S620, information about the number of inter-layer references, num_inter_layer_ref_pics_minus1 may be acquired from the bit stream (S630).

The information about the number of inter-layer references is encoded information indicating the number of active reference pictures. For example, the information about the number of inter-layer references may be encoded to a value being (the number of active reference pictures for use in inter-layer prediction of the current picture−1), for encoding efficiency.

The number of active references for the current picture, NumActiveRefLayerPics may be determined using the information about the number of inter-layer references, acquired in step S630 (S640).

For example, if the information about the number of inter-layer references is encoded to a value being (the number of active reference pictures for use in inter-layer prediction of the current picture−1), the number of active references for the current picture, NumActiveRefLayerPics may be calculated by adding 1 to the information about the number of inter-layer references.

On the contrary, if it is determined that the maximum number of active reference pictures for the current picture is limited in step S620, the number of active references for the current picture, NumActiveRefLayerPics may be determined according to the limited maximum number of active reference pictures for the current picture (S650).

For example, if the maximum number of active reference pictures for the current picture is limited to 1 according to the maximum active reference flag, max_one_active_ref_layer_flag, the number of active references for the current picture, NumActiveRefLayerPics may be set to 1.

FIG. 7 illustrates a syntax table of sublayer number information in an embodiment to which the present invention is applied.

Referring to FIG. 7, a sublayer present flag, sub_layer_vps_max_minus1_present_flag may be acquired from a bit stream (S700).

The sublayer present flag may indicate whether sublayer number information, sub_layer_vps_max_minus1[i] will be signaled. For example, if the value of the sublayer present flag is 1, the sublayer number information is signaled, and if the value of the sub-layer present flag is 0, the sublayer number information is not signaled.

Referring to FIG. 7, if the value of the sublayer present flag is 1, the sublayer number information sub_layer_vps_max_minus1[i] may be acquired from a bit stream (S710).

The sublayer number information sub_layer_vps_max_minus1[i] may indicate a value being (the maximum number of temporal sublayers included in an $i^{th}$ layer−1). Therefore, the sublayer number information sub_layer_vps_max_minus1[i] may indicate the maximum of temporal IDs allocated to the temporal sublayers included in the $i^{th}$ layer.

Meanwhile, sublayer number information may be acquired for each layer included in a video sequence. While the sublayer number information is shown in FIG. 7 as acquired from a video parameter set, the present invention is not limited thereto. The sublayer number information may be acquired from a sequence parameter set.

FIG. 8 illustrates a method for acquiring a maximum temporal indicator based on a maximum temporal present flag in an embodiment to which the present invention is applied.

Referring to FIG. 8, a maximum temporal present flag, max_tid_ref_present_flag may be acquired from a bit steam (S800).

The maximum temporal present flag, max_tid_ref_present_flag may indicate whether a maximum temporal indicator, max_tid_il_ref_pics_plus[i] will be signaled. For example, if the value of the maximum temporal present flag is 1, the maximum temporal indicator is signaled, and if the value of the maximum temporal present flag, max_tid_ref_present_flag is 0, the maximum temporal indicator is not signaled.

Referring to FIG. 8, if the value of the maximum temporal present flag, max_tid_ref_present_flag is 1, the maximum temporal indicator, max_tid_il_ref_pics_plus[i] may be acquired from the bit stream (S810).

The maximum temporal indicator, max_tid_il_ref_pics_plus[i] may mean a value calculated by adding 1 to the maximum of temporal IDs used in inter-layer prediction at an $i^{th}$ layer.

For example, if the value of the maximum temporal indicator, max_tid_il_ref_pics_plus[i] is 0, a picture of an $i^{th}$ layer among a plurality of layers of a video sequence is not used as a reference picture for inter-layer prediction. Herein, the picture of the $i^{th}$ layer may be not a random access picture but a non-random access picture.

On the contrary, if the value of the maximum temporal indicator, max_tid_il_ref_pics_plus[i] is larger than 0, a picture which at once belongs to the $i^{th}$ layer among the plurality of layers of the video sequence and has a temporal ID larger than the maximum temporal ID is not used as a reference picture for inter-layer prediction.

Therefore, only if the value of a maximum temporal indicator is larger than 0 and a picture belonging to a $i^{th}$ layer among a plurality of layers in a video sequence has a temporal ID equal to or smaller than a maximum temporal ID, the picture belonging to the $i^{th}$ layer may be used as a reference picture for inter-layer prediction. The maximum temporal ID is derived from the maximum temporal indicator. For example, the maximum temporal ID may be determined to be a value calculated by subtracting 1 from the value of the maximum temporal indicator.

Meanwhile, the maximum temporal indicator acquired in step S810 may have a value within a predetermined range (e.g., 0 to 7). If the maximum temporal indicator acquired in step S810 has the maximum of the values within the predetermined range, a corresponding picture of a reference layer may be used as an inter-layer reference picture for a current layer irrespective of the temporal ID, TemporalID of the corresponding picture of the reference layer.

However, if a maximum temporal indicator is signaled for each layer in FIG. 8 as in the above embodiment, all layers having direct dependency on the layer may have the same maximum temporal indicator, thereby decreasing the efficiency of inter-layer prediction. To solve the problem, a different maximum temporal ID may be set for a picture used for inter-layer prediction in a referred layer, on the basis of a layer pair having dependency, which will be described below with reference to FIG. 9.

FIG. 9 illustrates a method for acquiring a maximum temporal indicator in consideration of direct dependency in an embodiment to which the present invention is applied.

Referring to FIG. 9, a maximum temporal present flag, max_tid_ref_present_flag may be acquired from a bit stream (S900).

The maximum time level present flag, max_tid_ref_present_flag is information indicating the presence or absence of a maximum temporal indicator, which has been described in detail with reference to FIG. 8 and thus will not be described in detail herein.

Referring to FIG. 9, if the value of the maximum time level present flag is 1, it may be determined whether a $j^{th}$ layer has direct dependency on an $i^{th}$ layer (S910).

For example, it may be determined whether the $j^{th}$ layer has direct dependency on the $i^{th}$ layer based on a direct dependency flag, direct_dependency_flag[j][i]. That is, if the value of the direct dependency flag is 1, the $i^{th}$ layer may be used for inter-layer prediction of the $j^{th}$ layer. On the contrary, if the value of the direct dependency flag is 0, the $i^{th}$ layer may not be used for inter-layer prediction of the $j^{th}$ layer.

Only if it is determined that the $j^{th}$ layer has direct dependency on the $i^{th}$ layer in step S900, a maximum temporal indicator, max_tid_il_ref_pics_plus1[i][j] may be acquired from the bit stream (S920).

In other words, the maximum temporal indicator, max_tid_il_ref_pics_plus1[i][j] may be acquired for each layer pair having direct dependency, that is, each pair of a referring layer and a referred layer.

Herein, the maximum temporal indicator, max_tid_il_ref_pics_plus1[i][j] may mean a value calculated by adding 1 to the maximum of temporal IDs of the $i^{th}$ layer allowed for inter-layer prediction of the $j^{th}$ layer.

For example, if the value of the maximum temporal indicator is 0, a picture of the $i^{th}$ layer among a plurality of layers of a video sequence is not used as a reference picture for inter-layer prediction of a picture of the $j^{th}$ layer. Herein, the picture of the $i^{th}$ layer may be not a random access picture but a non-random access picture.

On the contrary, if the value of the maximum temporal indicator is larger than 0, a picture which at once belongs to the $i^{th}$ layer among the plurality of layers of the video sequence and has a temporal ID larger than the maximum temporal ID is not used as a reference picture for inter-layer prediction of a picture belonging to the $j^{th}$ layer.

Therefore, only if the value of the maximum temporal indicator is larger than 0 and a picture belonging to the $i^{th}$ layer among the plurality of layers of the video sequence has a temporal ID equal to or smaller than the maximum temporal ID, the picture of the $i^{th}$ layer may be used as a reference picture for inter-layer prediction of the picture of the $j^{th}$ layer. The maximum temporal ID is derived from the maximum temporal indicator. For example, the maximum temporal ID may be determined to be a value calculated by subtracting 1 from the value of the maximum temporal indicator.

Meanwhile, the maximum temporal indicator acquired in step S920 may have a value within a predetermined range (e.g., 0 to 7). If the maximum temporal indicator acquired in step S920 has the maximum of the values within the predetermined range, a corresponding picture of a reference layer may be used as an inter-layer reference picture for a current layer irrespective of the temporal ID, TemporalID of the corresponding picture of the reference layer.

If a different maximum temporal ID is set for each pair of layers having direct dependency as described above, the efficiency of inter-layer prediction may be increased, compared to the case in which the same maximum temporal ID is set for all layers having direct dependency.

Figure 10:
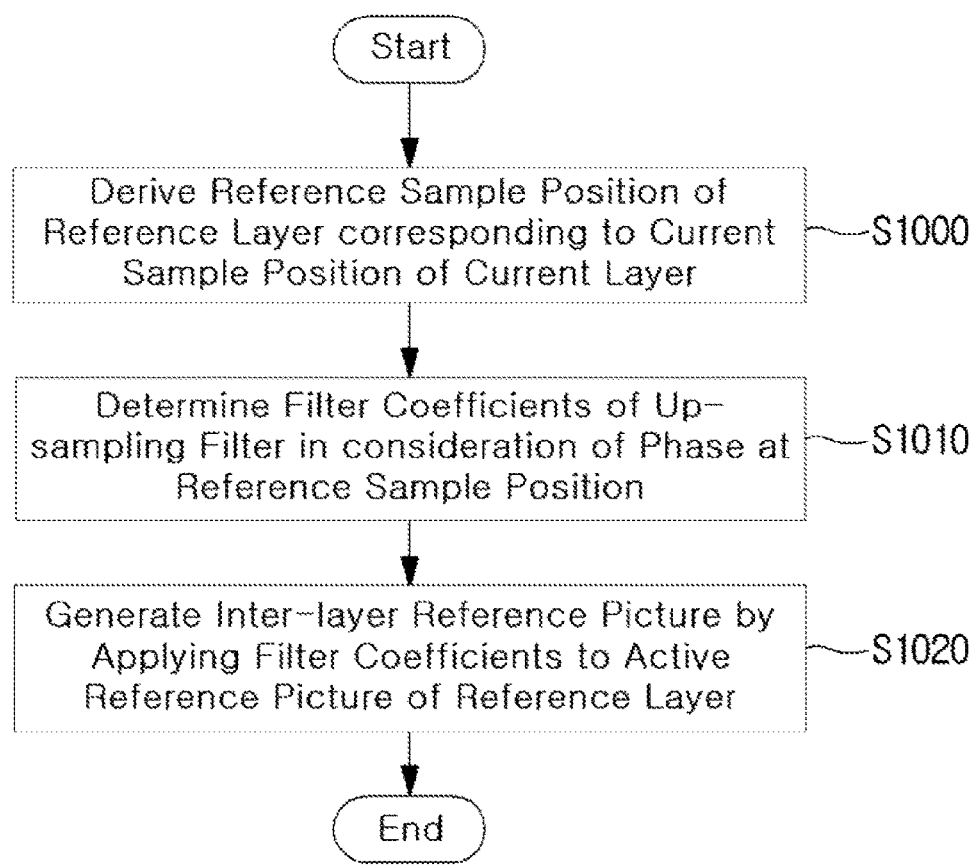
FIG. 10 is a flowchart illustrating a method for upsampling an active reference picture of a reference layer in an embodiment to which the present invention is applied.

FIG. 10 is a flowchart showing a method for up-sampling the active reference picture of a reference layer according to an embodiment to which the present invention is applied.

Referring to FIG. 10, a reference sample position of a reference layer, which corresponds to the current sample position of a current layer, may be derived (S1000).

Since the current layer and the reference layer may be different from each other in resolution, the reference sample position corresponding to the current sample position may be derived in consideration of the difference in resolution between the layers. That is, the aspect ratios between the picture of the current layer and the picture of the reference layer may be taken into consideration. Further, since the size of the up-sampled picture of the reference layer may not match the size of the picture of the current layer, an offset required to correct such a difference may be required.

For example, the reference sample position may be derived in consideration of a scale factor and the offset of the up-sampled reference layer.

Here, the scale factor may be calculated based on the width-length ratio between the current picture of the current layer and the active reference picture of the reference layer.

The up-sampled reference layer offset may mean information about a difference between the positions of any one sample located at the edge of the current picture and any one sample located at the edge of the inter-layer reference picture. For example, the up-sampled reference layer offset may include information about the difference between the horizontal/vertical positions of a top-left sample of the current picture and a top-left sample of the inter-layer reference picture and the difference between the horizontal/vertical positions of a bottom-right sample of the current picture and a bottom-right sample of the inter-layer reference picture.

The up-sampled reference layer offset may be obtained from a bitstream. For example, the up-sampled reference layer offset may be obtained from at least one of a video parameter set, a sequence parameter set, a picture parameter set, and a slice header.

Filter coefficients of an up-sampling filter may be determined in consideration of a phase at the reference sample position derived at step S1000 (S1010).

Here, as the up-sampling filter, either a fixed up-sampling filter or an adaptive up-sampling filter may be used.

1. Fixed Up-Sampling Filter

The fixed up-sampling filter may have preset filter coefficients without considering features of video. A tap filter may be used as the fixed up-sampling filter, which may be defined with respect to each of a luminance (luma) component and a chrominance (chroma) component. An up-sampling filter having a precision of a 1/16 of a sample unit will be described with reference to Tables 1 and 2.

TABLE 1

| Phase p | Coefficients of interpolation filter | | | | | | | |
|---|---|---|---|---|---|---|---|---|
| | f[p, 0] | f[p, 1] | f[p, 2] | f[p, 3] | f[p, 4] | f[p, 5] | f[p, 6] | f[p, 7] |
| 0 | 0 | 0 | 0 | 64 | 0 | 0 | 0 | 0 |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −3 | 47 | 31 | −10 | 4 | −1 |
| 7 | −1 | 4 | −11 | 45 | 34 | −10 | 4 | −1 |
| 8 | −1 | 4 | −11 | 40 | 40 | −11 | 4 | −1 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

Table 1 defines filter coefficients of the fixed up-sampling filter for the luma component.

As shown in Table 1, in the case of up-sampling the luma component, an 8-tap filter is applied. In other words, interpolation may be performed by using a reference sample of the reference layer, which corresponds to the current sample of the current layer, and neighboring samples adjacent to the reference sample. Here, the neighboring samples may be specified according to a direction of the interpolation. For example, when the interpolation is performed in the horizontal direction, the neighboring samples may include 3 consecutive samples in the left and 4 consecutive samples in the right with respect to the reference sample. Alternatively, when the interpolation is performed in the vertical direction, the neighboring samples may include 3 consecutive samples toward the top end and 4 consecutive samples toward the bottom end with respect to the reference sample.

In addition, since the interpolation is performed with the accuracy of the 1/16 sample unit, a total of 16 phases exist. This is for supporting resolutions of various magnifications of 2 and 1.5 times.

In addition, the fixed up-sampling filter may use a filter having different coefficients for each phase p. Except for the case where the phase p is 0, the magnitude of each filter coefficient may be defined to be in a range of 0 to 63. This means that filtering is performed with 6-bit precision. Here, the phase p of 0 means an integer sample position of n-multiple, when the interpolation is performed in a 1/n sample unit.

TABLE 2

| | Coefficients of interpolation filter | | | |
|---|---|---|---|---|
| Phase p | f[p, 0] | f[p, 1] | f[p, 2] | f[p, 3] |
| 0 | 0 | 64 | 0 | 0 |
| 1 | −2 | 62 | 4 | 0 |
| 2 | −2 | 58 | 10 | −2 |
| 3 | −4 | 56 | 14 | −2 |
| 4 | −4 | 54 | 16 | −2 |
| 5 | −6 | 52 | 20 | −2 |
| 6 | −6 | 46 | 28 | −4 |
| 7 | −4 | 42 | 30 | −4 |
| 8 | −4 | 36 | 36 | −4 |
| 9 | −4 | 30 | 42 | −4 |
| 10 | −4 | 28 | 46 | −6 |
| 11 | −2 | 20 | 52 | −6 |
| 12 | −2 | 16 | 54 | −4 |
| 13 | −2 | 14 | 56 | −4 |
| 14 | −2 | 10 | 58 | −2 |
| 15 | 0 | 4 | 62 | −2 |

Table 2 defines filter coefficients of the fixed up-sampling filter for the chroma component.

As shown in Table 2, in a case of up-sampling the chroma component, unlike the case of the luma component, a 4-tap filter may be applied. In other words, interpolation may be performed by using a reference sample of the reference layer, which corresponds to a current sample, and neighboring samples adjacent to the reference sample. Here, the neighboring samples may be specified according to a direction of the interpolation. For example, when the interpolation is performed in the horizontal direction, the neighboring samples may include 1 sample in the left and 2 consecutive samples in the right with respect to the reference sample. Alternatively, when the interpolation is performed in the vertical direction, the neighboring samples may include 1 sample toward the top end and 2 consecutive samples toward the bottom end with respect to the reference sample.

Furthermore, similarly to the case of the luma component, since the interpolation is performed with the accuracy of 1/16 sample unit, a total of 16 phases exist and different coefficients may be used for each phase p. Except for a case where the phase p is 0, the magnitude of each filter coefficient may be defined to be in a range of 0 to 62. This means that the filtering is also performed with 6-bit precision.

In the foregoing, the cases where the 8-tap filter is applied for the luma component and the 4-tap filter is applied for the chroma component are exemplified, but the present invention is not limited thereto and the order of a tap filter may be variably determined in consideration of a coding efficiency.

2. Adaptive Up-Sampling Filter

In an encoder, optimal filter coefficients are determined by considering features of an image without using the fixed filter coefficients, and are signaled to be transmitted to a decoder. Like this, an adaptive up-sampling filter uses filter coefficients that are adaptively determined. Since the features of an image vary in a picture unit, coding efficiency may be improved when an adaptive up-sampling filter capable of desirably representing the features of the image is used, rather than the fixed up-sampling filter for all cases.

An inter-layer reference picture may be generated by applying the filter coefficients determined at step S1010 to the active reference picture of the reference layer (S1020).

In detail, interpolation may be performed by applying the determined filter coefficients of the up-sampling filter to samples of the active reference picture. Here, the interpolation is primarily performed in the horizontal direction, and then secondarily performed in the vertical direction on the samples generated after the horizontal interpolation.

Figure 11:
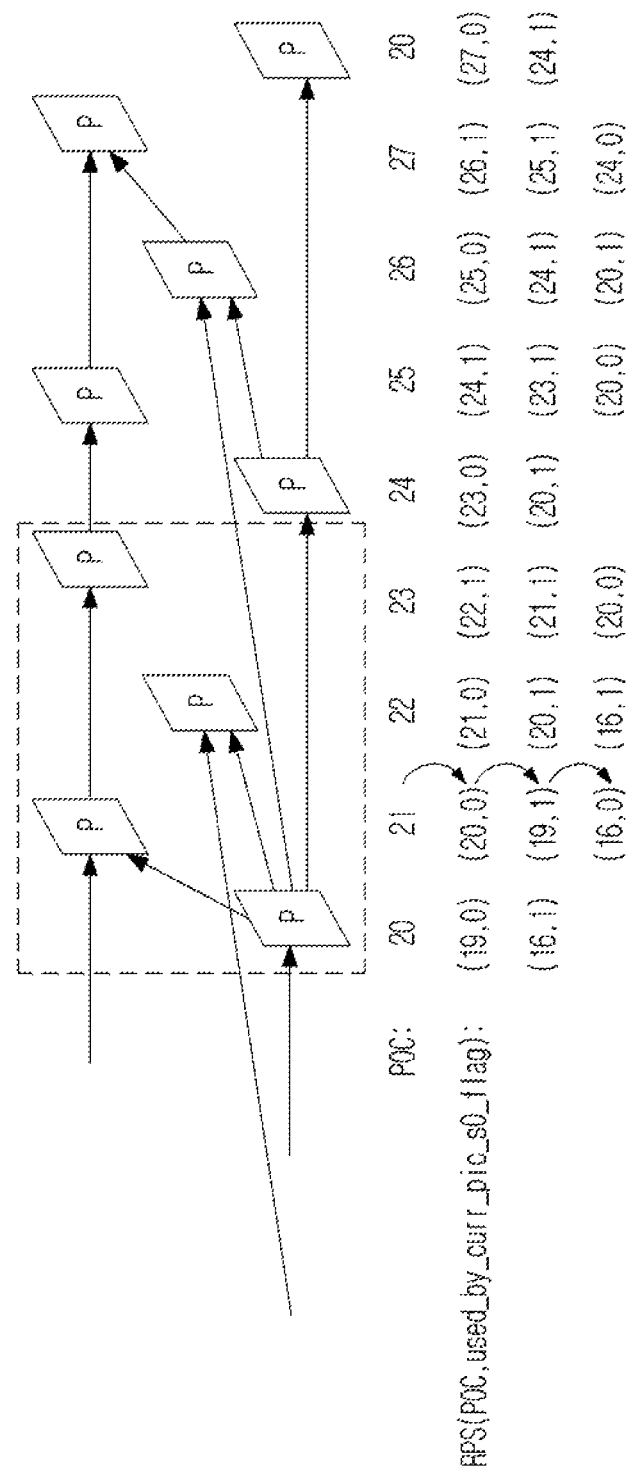
FIG. 11 illustrates a method for determining a short-term reference picture stored in a decoding picture buffer in an embodiment to which the present invention is applied.

FIG. 11 is a diagram showing a method for specifying a short-term reference picture stored in a decoding picture buffer.

Temporal reference pictures may be stored in the decoding picture buffer (DPB) and may be used as reference pictures when they are required for inter-prediction of a current picture. The temporal reference pictures stored in the decoding picture buffer may include short-term reference pictures. Such a short-term reference picture denotes a picture, the POC value of which does not have a large difference from that of the current picture.

Information for specifying a short-term reference picture to be stored in the decoding picture buffer in a current view is composed of the output order (POC) of reference pictures and a flag indicating whether the corresponding picture is directly referred to by the current picture (e.g. used_by_curr_pic_s0_flag, used_by_curr_pic_s1_flag), which are collectively called a reference picture set. In detail, when the value of used_by_curr_pic_s0_flag[i] is 0, if an i-th short-term reference picture in the short-term reference picture set has a output order (POC) value less than that of the current picture, it means that the i-th short-term reference picture is not used as the reference picture of the current picture. Further, when the value of used_by_curr_pic_s1_flag[i] is 0, if an i-th short-term reference picture in the short-term reference picture set has a output order (POC) value greater than that of the current picture, it means that the i-th short-term reference picture is not used as the reference picture of the current picture.

Referring to FIG. 11, in the case of a picture having a POC value of 26, a total of three pictures (i.e. pictures having POC values of 25, 24, and 20) may be used as short-term reference pictures for inter-prediction. However, since the value of used_by_curr_pic_s0_flag of the picture having a POC of 25 is 0, the picture having a POC value of 25 is not directly used for inter-prediction of the picture having a POC value of 26.

In this way, short-term reference pictures may be specified based on both the output order (POC) of the reference pictures and the flag indicating whether the corresponding picture is used as a reference picture by the current picture.

Meanwhile, pictures, which do not appear in the reference picture set for the current picture, may be marked with an indicator indicating that the pictures are not used as reference pictures (e.g. 'unused for reference'), and may then be removed from the decoding picture buffer.

Figure 12:
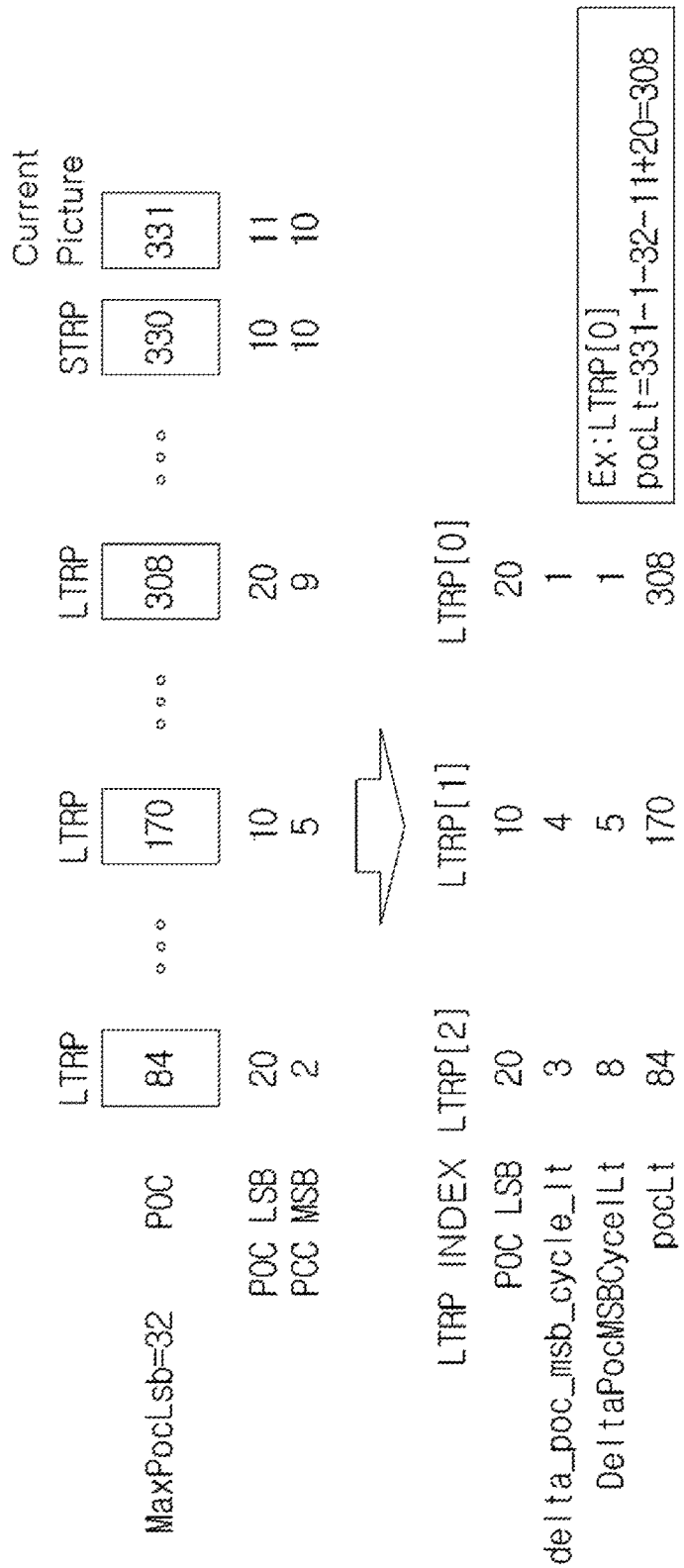
FIG. 12 illustrates a method for determining a long-term reference picture in an embodiment to which the present invention is applied.

FIG. 12 illustrates a method for specifying a long-term reference picture according to an embodiment to which the present invention is applied.

Since a long-term reference picture has a large difference in POC from a current picture, it may be represented using the Least significant bit (LSB) and Most Significant Bit (MSB) of a POC value.

Therefore, the POC value of the long-term reference picture may be derived using the LSB of the POC value of a reference picture, the POC value of the current picture, and a difference between the MSB of the POC value of the current picture and the MSB of the POC value of the reference picture.

For example, it is assumed that the POC of the current picture is 331 and a maximum value that can be represented by LSB is 32, and that a picture having a POC value of 308 is used as a long-term reference picture.

In this case, the POC value of the current picture, that is, 331, may be represented by 32*10+11, wherein 10 is the MSB value, and 11 is the LSB value. The POC value of the long-term reference picture, that is, 308, may be represented by 32*9+20, wherein 9 is the MSB value and 20 is the LSB value. Here, the POC value of the long-term reference picture may be derived using an equation shown in FIG. 12.

Figure 13:
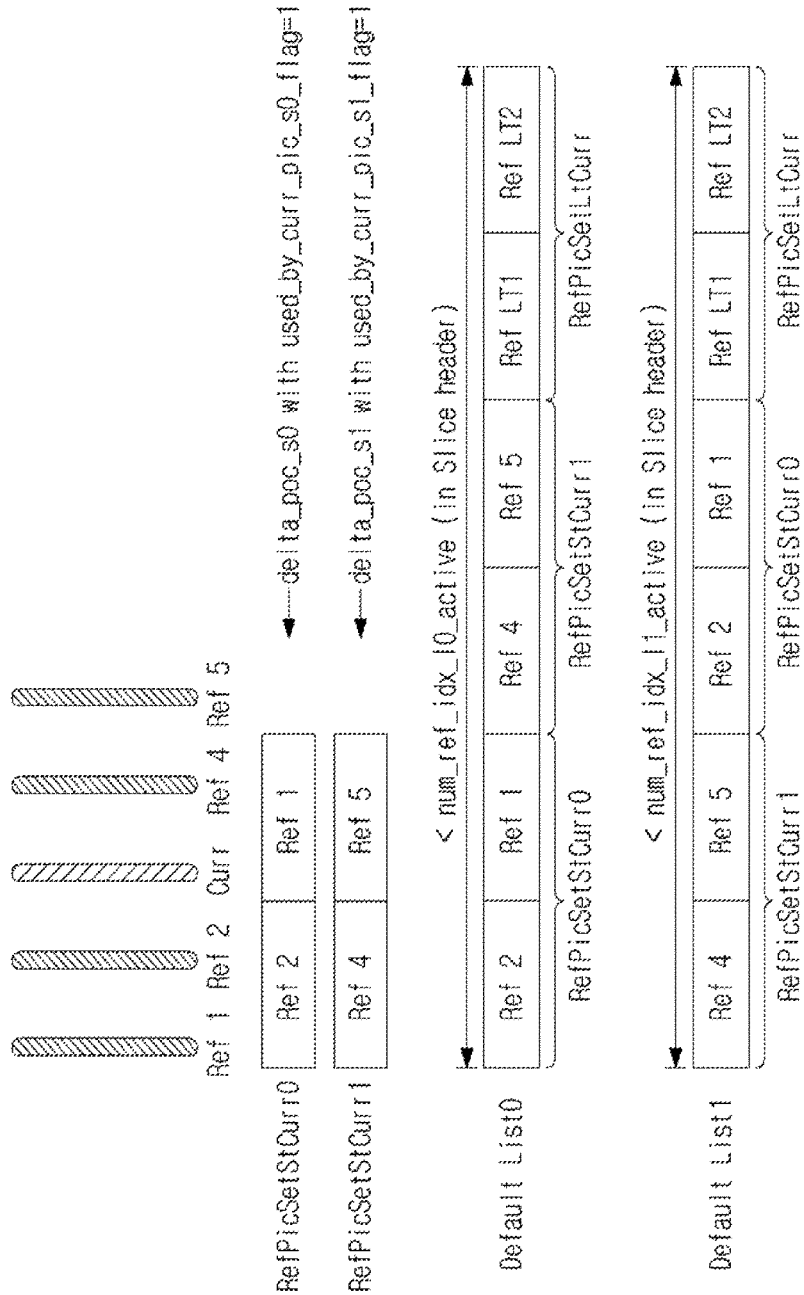
FIG. 13 illustrates a method for constructing a reference picture list with short-term reference pictures and long-term reference pictures in an embodiment to which the present invention is applied.

FIG. 13 illustrates a method for constructing a reference picture list using a short-term reference picture and a long-term reference picture according to an embodiment to which the present invention is applied.

Referring to FIG. 13, a reference picture list including temporal reference pictures may be generated in consideration of information about whether temporal reference pictures are short-term reference pictures and the POC values of short-term reference pictures. Here, the reference picture list may include at least one of reference picture list 0 for L0 prediction and reference picture list 1 for L1 prediction.

More specifically, the reference picture list 0 may be arranged in the sequence of a short-term reference picture (RefPicSetCurr 0) having a POC value less than that of the current picture, a short-term reference picture (RefPicSetCurr 1) having a POC value greater than that of the current picture, and a long-term reference picture (RefPicSetLtCurr).

Meanwhile, the reference picture list 1 may be arranged in the sequence of a short-term reference picture (RefPicSetCurr 1) having a POC value greater than that of the current picture, a short-term reference picture (RefPicSetCurr 0) having a POC value less than that of the current picture, and a long-term reference picture (RefPicSetLtCurr).

Further, in order to improve encoding efficiency for reference indices of temporal reference pictures, multiple temporal reference pictures included in the reference picture list may be rearranged (modified). This may be adaptively performed based on a list modification flag (list_modification_present_flag). Here, the list modification flag denotes information for specifying whether to modify reference pictures in the reference picture list. The list modification flag may be individually signaled for the reference picture list 0 and for the reference picture list 1.

For example, reference pictures in the reference picture list are not modified when the value of the list modification flag (list_modification_present_flag) is 0, and the reference pictures in the reference picture list may be modified only when the value of the list modification flag (list_modification_present_flag) is 1.

When the value of the list modification flag (list_modification_present_flag) is 1, the reference pictures in the reference picture list may be modified using list entry information (list entry[i]). Here, 'list entry information (list_entry[i])' may specify the reference index of a reference picture located at the current position (i.e. i-th entry) in the reference picture list.

More specifically, a reference picture corresponding to the list entry information (list_entry[i]) in the generated reference picture list is specified, and the specified reference picture may be rearranged in the i-th entry in the reference picture list.

As many pieces of list entry information as the number of reference pictures included in the reference picture list or as the maximum value of the reference index of the reference picture list may be obtained. Also, the list entry information may be obtained in consideration of the slice type of the current picture. That is, when the slice type of the current picture is P slice, list entry information(list_entry_10[i]) for reference picture list 0 may be obtained, whereas when the slice type of the current picture is B slice, list entry information (list_entry_11[i]) for reference picture list 1 may be additionally obtained.

FIGS. 14 to 16 illustrate a method for constructing a reference picture list in a multi-layer structure according to embodiments to which the present invention is applied.

Referring to FIG. 14, reference picture list 0 in a multi-layer structure may be constructed in the sequence of a short-term reference picture (hereinafter referred to as a 'first short-term reference picture') having a POC value less than that of a current picture, a short-term reference picture (hereinafter referred to as a 'second short-term reference picture') having a POC value greater than that of the current picture, and a long-term reference picture. Reference picture list 1 may be constructed in the sequence of a second short-term reference picture, a first short-term reference picture, and a long-term reference picture. Further, an inter-layer reference picture may be added to the position subsequent to the long-term reference picture in each of the reference picture list 0 and the reference picture list 1.

However, in the multi-layer structure, when a picture in an enhancement layer and a picture in a base layer are similar to each other, the enhancement layer may frequently use the inter-layer reference picture of the base layer. In this case, when the inter-layer reference picture is added to the last position of the reference picture list, encoding performance of the reference picture list may be deteriorated. Therefore, as shown in FIGS. 15 and 16, encoding performance of the reference picture list may be improved by adding the inter-layer reference picture to the position prior to the long-term reference picture.

Referring to FIG. 15, an inter-layer reference picture may be arranged between short-term reference pictures in the reference picture list. In a multi-layer structure, reference picture list 0 may be constructed in the sequence of a first short-term reference picture, an inter-layer reference picture, a second short-term reference picture, and a long-term reference picture. Reference picture list 1 may be constructed in the sequence of a second short-term reference picture, an inter-layer reference picture, a first short-term reference picture, and a long-term reference picture.

Alternatively, an inter-layer reference picture may be arranged between a short-term reference picture and a long-term reference picture in the reference picture list. Referring to FIG. 16, reference picture list 0 in a multi-layer structure may be constructed in the sequence of a first short-term reference picture, a second short-term reference picture, an inter-layer reference picture, and a long-term reference picture. Reference picture list 1 may be constructed in the sequence of a second short-term reference picture, a first short-term reference picture, an inter-layer reference picture, and a long-term reference picture.

Meanwhile, in FIGS. 14 to 16, as an example in which a reference picture list is constructed, the case where a single short-term reference picture having a POC value less than that of the current picture, a single short-term reference picture having a POC value greater than that of the current picture, a single long-term reference picture, and a single inter-layer reference picture are individually present is illustrated. However, this example merely shows the sequence in which reference pictures are arranged, and it is apparent that multiple short-term reference pictures (i.e. a short-term reference picture set), long-term reference pictures (i.e. a long-term reference picture set), and inter-layer reference pictures (i.e. an inter-layer reference picture set) may be used.

Furthermore, when multiple inter-layer reference pictures are used, the multiple inter-layer reference pictures may be separated into a first inter-layer reference picture set and a second inter-layer reference picture set, and thus the reference picture list may be constructed.

More specifically, the first inter-layer reference picture set may be arranged between the first short-term reference picture and the second short-term reference picture, and the second inter-layer reference picture set may be arranged subsequent to the long-term reference picture. However, the present invention is not limited to the examples, and may include all possible embodiments that may be derived from combinations of the embodiments shown in FIGS. 14 to 16.

Here, the first inter-layer reference picture set may mean reference pictures of a reference layer having a reference layer identifier (RefPiclayerId) smaller than the layer identifier (CurrlayerId) of the current layer, and the second inter-layer reference picture set may mean the reference pictures of a reference layer having a reference layer identifier (RefPiclayerId) larger than the layer identifier (CurrlayerId) of the current layer.

FIG. 17 is a flowchart illustrating a procedure for performing inter-layer prediction for a current block based on spatial offset information in an embodiment to which the present invention is applied.

Referring to FIG. 17, spatial offset information may be acquired (S1700).

The spatial offset information may indicate the position difference between a call block and a reference block of a current block. The call block may refer to a block at the same position as the current block in a corresponding picture of a reference layer (i.e., an inter-layer reference picture). The reference block may refer to a block used for inter-layer prediction of the current block in the corresponding picture of the reference layer.

Specifically, the spatial offset information may include at least one of a segment offset and a block offset. The segment offset, which is an offset represented in units of a slice segment, a tile, or a Coding Tree Unit (CTU) row, may indicate a spatial area which is not used for inter-layer prediction of a picture in the current layer, in a picture of the reference layer. Or the segment offset, which is an offset represented in units of a slice segment, a tile, or a CTU row, may indicate a spatial area specifying reference blocks used for inter-layer prediction of a picture in the current layer, in a picture of the reference layer. The block offset is an offset represented in units of a block and may indicate, along with the segment offset, a spatial area which is not used for inter-layer prediction of the picture of the current layer, in the picture of the reference layer. Or the block offset is an offset represented in units of a block and may indicate a spatial area specifying a block used for inter-layer prediction of the picture of the current layer, in the picture of the reference layer. Herein, a block unit may be a CTU, and a CTU may be a maximum coding unit of a video sequence.

The spatial offset information may be acquired from Video Usability Information (VUI) included in a video parameter set. The VUI may provide information which is used not for decoding a luminance component and a chrominance component but for decoder conformance or output timing conformance. A specific method for acquiring spatial offset information will be described below with reference to FIG. 18.

Referring to FIG. 17, a reference block used for inter-layer prediction of a current block may be determined based on spatial offset information (S1710).

Specifically, the reference block may be determined to be a block at a position apart from a call block by an offset indicated by the spatial offset information, which will be described with reference to FIG. 19.

Inter-layer prediction may be performed for the current block based on the reference block determined in step S1710 (S1720).

FIG. 18 illustrates a syntax table of spatial offset information in an embodiment to which the present invention is applied.

Referring to FIG. 18, an inter-layer prediction restriction flag, ilp_restricted_ref_layers_flag may be acquired (S1800).

The inter-layer prediction restriction flag, ilp_restricted_ref_layers_flag may indicate whether the constraint that a reference block of a reference layer determined based on spatial offset information is used for inter-layer prediction of a current block is applied. If the value of the inter-layer prediction restriction flag is 1, this may imply application of the constraint that a reference block of a reference layer determined based on spatial offset information is used for inter-layer prediction of a current block. On the contrary, if the value of the inter-layer prediction restriction flag is 0, this may imply non-application of the constraint that a reference block of a reference layer determined based on spatial offset information is used for inter-layer prediction of a current block. Thus, a reference block determined based on spatial offset information may or may not be used for inter-layer prediction of a current block.

If the value of the inter-layer prediction restriction flag is 1, a segment offset, min_spatial_segment_offset_plus[i][j] may be acquired (S1810).

The segment offset, min_spatial_segment_offset_plus[i][j] may indicate a spatial area which is not used for inter-layer prediction of a picture belonging to a current $i^{th}$ layer, in each picture of a $j^{th}$ reference picture having direct dependency on the current $i^{th}$ layer.

A block offset flag, ctu_based_offset_enable_flag[i][j] may be acquired based on the segment offset acquired in step S1810 (S1820).

The block offset flag, ctu_based_offset_enable_flag[i][j] may indicate whether a block offset is to be used in indicating a spatial area of the $j^{th}$ area, which is not used for inter-layer prediction of a picture belonging to the current $i^{th}$ layer. For example, if the value of the block offset flag is 1, this may imply that the spatial area of the $j^{th}$ area, which is not used for inter-layer prediction of the picture belonging to the current $i^{th}$ layer is indicated by the block offset together with the segment offset. On the contrary, if the value of the block offset flag is 0, this may imply that the spatial area of the $j^{th}$ area, which is not used for inter-layer prediction of the picture belonging to the current $i^{th}$ layer is indicated only by the segment offset.

Meanwhile, if the value of the segment offset acquired in step S1810 is larger than 0, the block offset flag may be acquired. This is because if the value of the segment offset is larger than 0, there is a spatial area in a picture of the $j^{th}$ reference layer, which is not used for inter-layer prediction of a picture of the current $i^{th}$ layer.

A block offset, min_horizontal_ctu_offset_plus1 may be acquired based on the block offset flag acquired in step S1820 (S1830).

Specifically, the block offset may be acquired, when the block offset flag indicates that a spatial area in a picture of the $j^{th}$ reference layer, which is unused for inter-layer prediction of a picture belonging to the current $i^{th}$ layer, is indicated by both the segment offset and the block offset (i.e., the value of the block offset flag is 1).

Figure 19:
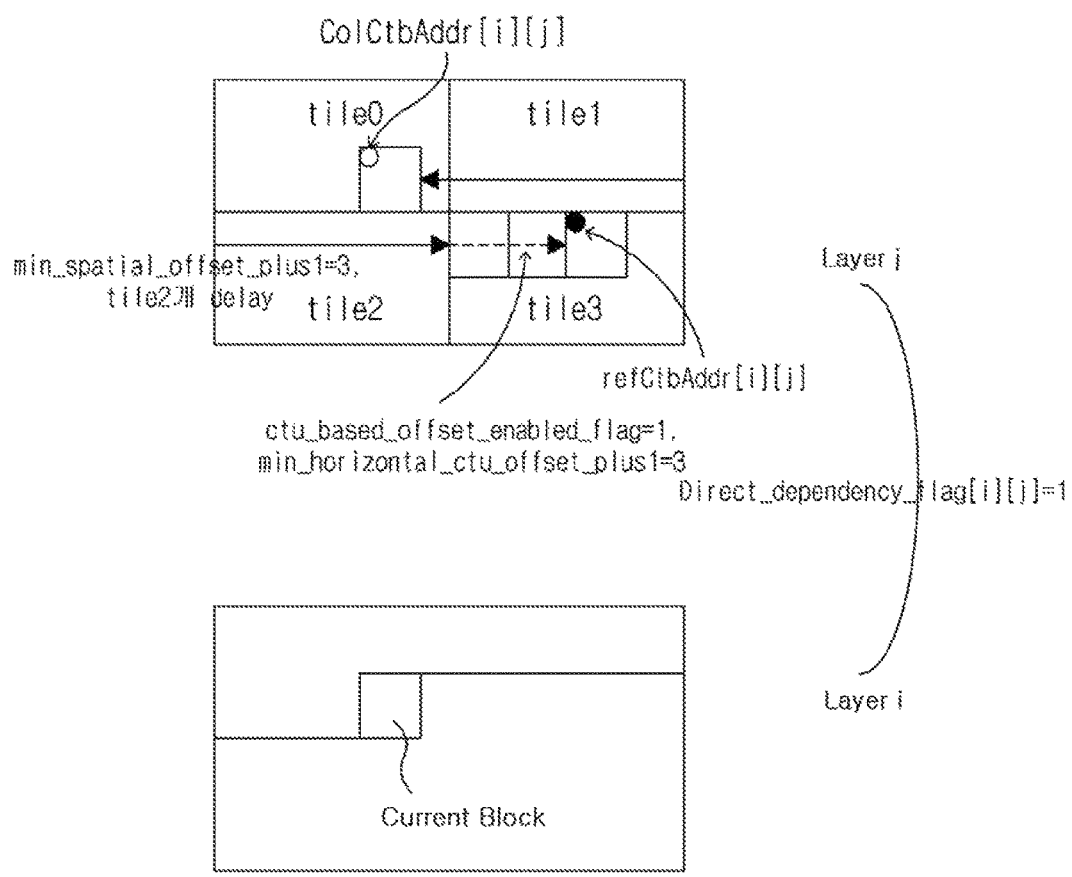
FIG. 19 illustrates a method for determining a reference block for use in inter-layer prediction of a current block using spatial offset information in an embodiment to which the present invention is applied.

FIG. 19 illustrates a method for determining a reference block for use in inter-layer prediction of a current block, using spatial offset information in an embodiment to which the present invention is applied.

Referring to FIG. 19, colCtbAddr[i][j] of a $j^{th}$ reference layer represents a block at the same position as a current block of a current $i^{th}$ layer, that is, the position of a call block. The $j^{th}$ reference layer may have direct dependency on the current $i^{th}$ layer. refCtbAddr[i][j] represents the position of a reference block used for inter-layer prediction of the current block. refCtbAddr[i][j] may be determined based on colCtbAddr[i][j] and spatial offset information (for example, min_spatial_segment_offset_plus1 and min_horizontal_ctu_offset_plus1). The positions of the call block or the reference block may be represented as a raster scan address. A specific method for determining refCtbAddr[i][j] will be described based on the embodiment described with reference to FIG. 18.

Specifically, refCtbAddr[i][j] may be derived by Equation 1.

refCtbAddr[i][j]=colCtbAddr[i][j]+xOffset[i][j]+yOffset[i][j]     Equation 1 xOffset[i][j] and yOffset[i][j] may be derived from Equation 1 by Equation 2.

xOffset[i][j]=((xColCtbAddr[i][j]+minHorizontalCtbOffset[i][j])>(refPicWidthInCtbY[i][j]−1))?
(refPicWidthInCtbY[i][j]−1−xColCtb [i][j]):
(minHorizontalCtbOffset[i])     Equation 2 p yOffset[i][j]=(min_spatial_segment_offset_plus1−1)*refPicWidthInCtbY[i][j]

In Equation 2, xColCtb[i][j] corresponds to an x component of the coordinates of the call block in the picture of the $j^{th}$ layer. refPicWidthInCtbY[i][j] represents the number of CTUs included in a CTU row in the picture of the $j^{th}$ layer.

Also, minHorizontalCtbOffset[i][j] may be derived based on the block offset min_horizontal_ctu_offset_plus1. For example, if the value of the block offset is 0, minHorizontalCtbOffset[i][j] may be derived to be (refPicWidthInCtbY[i][j]−1), and if the value of the block offset is larger than 0, minHorizontalCtbOffset[i][j] may be derived to be (min_horizontal_ctu_offset_plus1−1), as in Equation 3.

minHorizontalCtbOffset[i][j]=(min_horizontal_ctu_offset_plus1>0)?

(min_horizontal_ctu_offset_plus1−1) (refPicWidthInCtbY[i][j]−1)     Equation 3

Or minHorizontalCtbOffset[i][j] may be derived by Equation 4, in further consideration of whether the value of the block offset is 1 as well as whether the value of the block offset is larger than 0.

minHorizontalCtbOffset[i][j]=(min_horizontal_ctu_offset_plus1>0)?

(min_horizontal_ctu_offset_plus1=1)?

min_horizontal_ctu_offset_plus1[i][j]:(min_horizontal_ctu_offset_plus1−1)):(refPicWidthInCtbY[i][j]−1)     Equation 4

INDUSTRIAL APPLICABILITY

The present invention may be used in encoding a video signal of a multi-layer structure.

The invention claimed is:

1. A method for decoding a multi-layer video signal, the method comprising:
   determining whether all candidate reference pictures of a current picture are used for inter-layer prediction of the current picture in a current layer, based on an all active flag;
   determining number of active references for the current picture of the current layer based on number of all candidate reference pictures if it is determined that all candidate reference pictures are used for inter-layer prediction of the current picture;
   determining number of active references for the current picture of the current layer in consideration of whether a maximum number of active reference pictures for the current picture is limited, if it is determined that all candidate reference pictures are not applied to inter-layer prediction of the current picture;
   acquiring a reference layer Identifier (ID) based on the determined number of active references;
   determining an active reference picture for the current picture using the reference layer ID;
   generating an inter-layer reference picture by upsampling the active reference picture; and
   performing inter-layer prediction for the current picture, using the inter-layer reference picture,
   wherein it is determined whether the maximum number of active reference pictures for the current picture is limited, based on a maximum active reference flag,
   wherein the maximum active reference flag equals to a first value specifies that the number of active reference pictures available for inter-layer prediction of each picture of the video sequence is limited to 1, and the maximum active reference flag equals to a second value specifies that a plurality of active reference pictures are available for inter-layer prediction of each picture of the video sequence, and
   wherein if the maximum number of active reference pictures is limited to 1 according to the maximum active reference flag, the number of active references is determined according to the limited maximum number of active reference pictures.

2. The method according to claim 1, wherein the performing of inter-layer prediction for the current picture comprises:
   acquiring spatial offset information including at least one of a segment offset and a block offset;
   determining a reference block for use in inter-layer prediction of a current block in the current picture based on the spatial offset information; and
   estimating a sample value of the current block based on the determined reference block.

3. An apparatus for decoding a multi-layer video signal, the apparatus comprising:
   a memory configured to store pictures of reference layers for inter layer-prediction; and
   a prediction unit including an inter-layer prediction unit for performing inter-layer prediction for a current layer using a corresponding picture of a reference layer received from the memory, the inter-layer prediction unit is configured to, determine whether all candidate reference pictures of a current picture are used for inter-layer prediction of the current picture in a current layer, based on an all active flag;

determine number of active references for the current picture of the current layer based on number of all candidate reference pictures if it is determined that all candidate reference pictures are used for inter-layer prediction of the current picture;

determine number of active references for a current picture of a current layer in consideration of whether a maximum number of active reference pictures for the current picture is limited, acquire a reference layer Identifier (ID) based on the determined number of active references, determine an active reference picture for the current picture using the reference layer ID, generate an inter-layer reference picture by upsampling the active reference picture, and perform inter-layer prediction for the current picture, using the inter-layer reference picture, wherein it is determined whether the maximum number of active reference pictures for the current picture is limited, based on a maximum active reference flag, wherein the maximum active reference flag equals to a first value specifies that the number of active reference pictures available for inter-layer prediction of each picture of the video sequence is limited to 1, and the maximum active reference flag equals to a second value specifies that a plurality of active reference pictures are available for inter-layer prediction of each picture of the video sequence, and wherein if the maximum number of active reference pictures is limited to 1 according to the maximum active reference flag, the prediction unit determines the number of active references according to the limited maximum number of active reference pictures.

4. The apparatus according to claim 3, wherein the prediction unit acquires spatial offset information including at least one of a segment offset and a block offset, determines a reference block for use in inter-layer prediction of a current block in the current picture based on the spatial offset information, and estimates a sample value of the current block based on the determined reference block.

5. A method for encoding a multi-layer video signal, the method comprising:

determining whether all candidate reference pictures of a current picture are used for inter-layer prediction of the current picture in a current layer, based on an all active flag;

determining number of active references for the current picture of the current layer based on number of all candidate reference pictures if it is determined that all candidate reference pictures are used for inter-layer prediction of the current picture;

determining number of active references for a current picture of a current layer in consideration of whether a maximum number of active reference pictures for the current picture is limited if it is determined that all candidate reference pictures are not applied to inter-layer prediction of the current picture;

acquiring a reference layer Identifier (ID) based on the determined number of active references;

determining an active reference picture for the current picture using the reference layer ID;

generating an inter-layer reference picture by upsampling the active reference picture; and performing inter-layer prediction for the current picture, using the inter-layer reference picture, wherein it is determined whether the maximum number of active reference pictures for the current picture is limited, based on a maximum active reference flag, wherein the maximum active reference flag equals to a first value specifies that the number of active reference pictures available for inter-layer prediction of each picture of the video sequence is limited to 1, and the maximum active reference flag equals to a second value specifies that a plurality of active reference pictures are available for inter-layer prediction of each picture of the video sequence, and wherein if the maximum number of active reference pictures is limited to 1 according to the maximum active reference flag, the number of active references is determined according to the limited maximum number of active reference pictures.

6. The method according to claim 5, wherein the performing of inter-layer prediction for the current picture comprises:

acquiring spatial offset information including at least one of a segment offset and a block offset;

determining a reference block for use in inter-layer prediction of a current block in the current picture based on the spatial offset information; and estimating a sample value of the current block based on the determined reference block.

7. An apparatus for encoding a multi-layer video signal, the apparatus comprising:

a memory configured to store pictures of reference layers for inter layer-prediction; and a prediction unit including an inter-layer prediction unit for performing inter-layer prediction for a current layer using a corresponding picture of a reference layer received from the memory, the inter-layer prediction unit is configured to, determine whether all candidate reference pictures of a current picture are used for inter-layer prediction of the current picture in a current layer, based on an all active flag;

determine number of active references for the current picture of the current layer based on number of all candidate reference pictures if it is determined that all candidate reference pictures are used for inter-layer prediction of the current picture;

determine number of active references for a current picture of a current layer in consideration of whether a maximum number of active reference pictures for the current picture is limited, acquire a reference layer Identifier (ID) based on the determined number of active references, determine an active reference picture for the current picture using the reference layer ID, generate an inter-layer reference picture by upsampling the active reference picture, and perform inter-layer prediction for the current picture, using the inter-layer reference picture, wherein it is determined whether the maximum number of active reference pictures for the current picture is limited, based on a maximum active reference flag, wherein the maximum active reference flag equals to a first value specifies that the number of active reference pictures available for inter-layer prediction of each picture of the video sequence is limited to 1, and the maximum active reference flag equals to a second value specifies that a plurality of active reference pictures are available for inter-layer prediction of each picture of the video sequence, and wherein if the maximum number of active reference pictures is limited to 1 according to the maximum active reference flag, the prediction unit determines the number of active references according to the limited maximum number of active reference pictures.

8. The apparatus according to claim 7, wherein the inter-layer prediction unit perform the inter-layer prediction by acquiring spatial offset information including at least one of a segment offset and a block offset, determining a reference block for use in inter-layer prediction of a current block in the current picture based on the spatial offset information, and estimating a sample value of the current block based on the determined reference block.

9. The method according to claim 1, wherein the inter-layer prediction is performed by a reference picture list, the reference picture list is constructed in the sequence of a first short-term reference picture, the inter-layer reference picture, a second short-term reference picture, and a long-term reference picture, wherein the first short-term reference picture has an output order (POC) value less than that of the current picture, the second short-term reference picture has an output order (POC) value greater than that of the current picture.

10. The method according to claim 1, wherein the inter-layer prediction is performed by a reference picture list, the reference picture list is composed of a reference picture list 0 and a reference picture list 1, wherein the reference picture list 0 is constructed in the sequence of a first short-term reference picture, the inter-layer reference picture, a second short-term reference picture, and a long-term reference picture, and the reference picture list 1 is constructed in the sequence of a second short-term reference picture, the inter-layer reference picture, a first short-term reference picture, and a long-term reference picture wherein the first short-term reference picture has an output order (POC) value less than that of the current picture, the second short-term reference picture has an output order (POC) value greater than that of the current picture.

11. The apparatus according to claim 3, wherein the inter-layer prediction is performed by a reference picture list, the reference picture list is constructed in the sequence of a first short-term reference picture, the inter-layer reference picture, a second short-term reference picture, and a long-term reference picture, wherein the first short-term reference picture has an output order (POC) value less than that of the current picture, the second short-term reference picture has an output order (POC) value greater than that of the current picture.

12. The apparatus according to claim 3, wherein the inter-layer prediction is performed by a reference picture list, the reference picture list is composed of a reference picture list 0 and a reference picture list 1, wherein the reference picture list 0 is constructed in the sequence of a first short-term reference picture, the inter-layer reference picture, a second short-term reference picture, and a long-term reference picture, and the reference picture list 1 is constructed in the sequence of a second short-term reference picture, the inter-layer reference picture, a first short-term reference picture, and a long-term reference picture wherein the first short-term reference picture has an output order (POC) value less than that of the current picture, the second short-term reference picture has an output order (POC) value greater than that of the current picture.

* * * * *